US008494498B2

(12) United States Patent
Kwon

(10) Patent No.: US 8,494,498 B2
(45) Date of Patent: Jul. 23, 2013

(54) MOBILE TERMINAL AND DISPLAYING METHOD THEREOF

(75) Inventor: Taejung Kwon, Seoul (KR)

(73) Assignee: LG Electronics Inc, Seoul (KR)

( * ) Notice: Subject to any disclaimer, the term of this patent is extended or adjusted under 35 U.S.C. 154(b) by 104 days.

(21) Appl. No.: 13/035,702

(22) Filed: Feb. 25, 2011

(65) Prior Publication Data

US 2011/0300902 A1     Dec. 8, 2011

(30) Foreign Application Priority Data

Jun. 7, 2010 (KR) ......................... 10-2010-0053147

(51) Int. Cl.
*H04M 3/42*     (2006.01)

(52) U.S. Cl.
USPC ................. 455/414.1; 455/414.2; 382/190

(58) Field of Classification Search
USPC ............................. 455/414.1, 414.2; 382/190
See application file for complete search history.

(56) References Cited

U.S. PATENT DOCUMENTS

| | | | |
|---|---|---|---|
| 2008/0268876 A1* | 10/2008 | Gelfand et al. | 455/457 |
| 2008/0270235 A1 | 10/2008 | Yoon et al. | |
| 2009/0270124 A1 | 10/2009 | Yamada et al. | |
| 2009/0310866 A1* | 12/2009 | Hamasaki et al. | 382/190 |
| 2009/0317019 A1 | 12/2009 | Puliur | |

FOREIGN PATENT DOCUMENTS

| | | |
|---|---|---|
| CN | 101189862 A | 5/2008 |
| CN | 101686301 A | 3/2010 |
| EP | 1 030 521 A1 | 8/2000 |
| JP | 2007-34585 A | 2/2007 |

* cited by examiner

*Primary Examiner* — Justin Lee
(74) *Attorney, Agent, or Firm* — Birch, Stewart, Kolasch & Birch, LLP

(57) ABSTRACT

A mobile terminal and corresponding method are discussed. The mobile terminal includes a camera obtaining an image; a display unit displaying the obtained image; and a controller displaying advertisement images about at least one point of purchase included in the obtained image by overlapping the advertisement images with the image and if a selection signal about the displayed advertisement images is received, displaying the advertisement image for which the selection signal has been received in such a way to be distinguished from the advertisement image before receiving the selection signal. An advertisement image may be displayed on an image obtained from a camera and an advertisement image for which a selection signal has been received may be displayed in such a way to be distinguished from the advertisement image before receiving the selection signal, thereby enabling the user to easily recognize which advertisement image he or she has selected.

19 Claims, 26 Drawing Sheets

FIG. 13
(a) 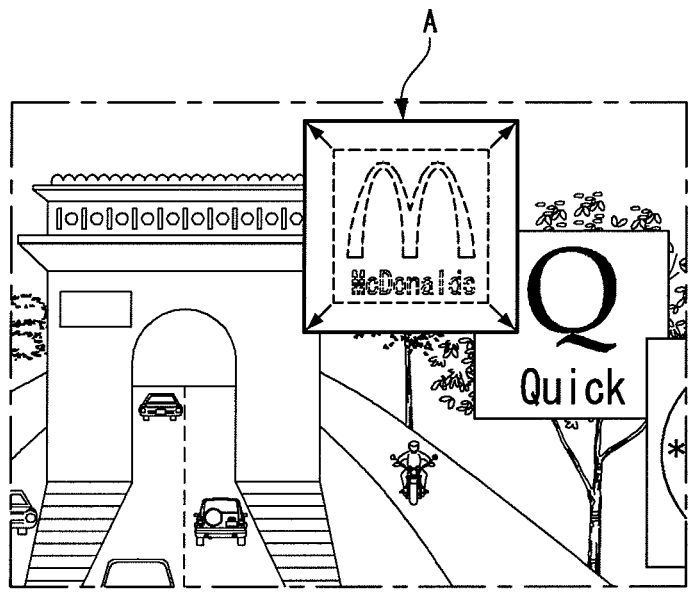
(b) 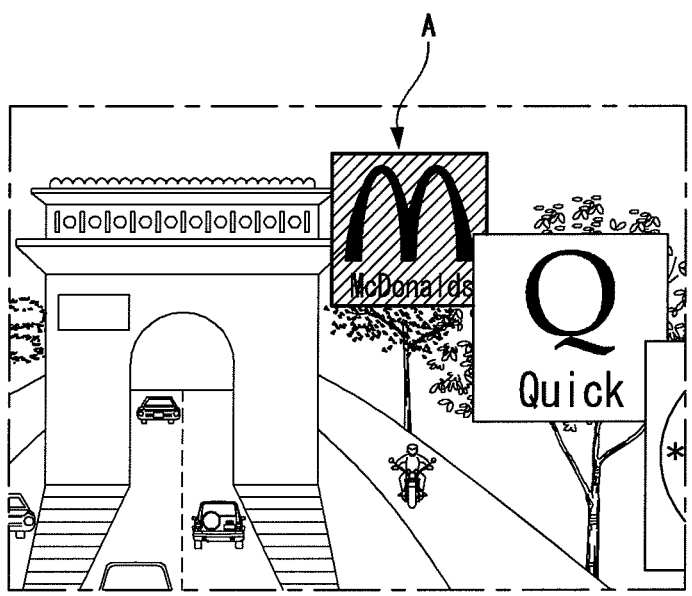

MOBILE TERMINAL AND DISPLAYING METHOD THEREOF

CROSS REFERENCE TO RELATED APPLICATIONS

This application claims the benefit of Korean Patent Application No. 10-2010-0053147 filed on 7 Jun. 2010 which are hereby incorporated by reference.

BACKGROUND OF THE INVENTION

1. Field of the Invention

The present invention relates to a mobile terminal and a displaying method thereof. More specifically, the present invention relates to a mobile terminal and a displaying method thereof where an advertisement image is displayed being overlaid with an image captured by a camera and an advertisement image for which a selection signal has been received is displayed in such a way to be distinguished from the advertisement image before receiving the selection signal, thereby enabling the user to easily recognize which advertisement image he or she has selected.

2. Discussion of the Background Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY OF THE INVENTION

The present invention relates to a mobile terminal and a displaying method thereof. More specifically, the present invention relates to a mobile terminal and a displaying method thereof where an advertisement image is displayed being overlaid with an image captured by a camera and an advertisement image for which a selection signal has been received is displayed in such a way to be distinguished from the advertisement image before receiving the selection signal, thereby enabling the user to easily recognize which advertisement image he or she has selected.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

FIGS. 13 and 14 illustrate the operation of the mobile terminal of FIG. 12;

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
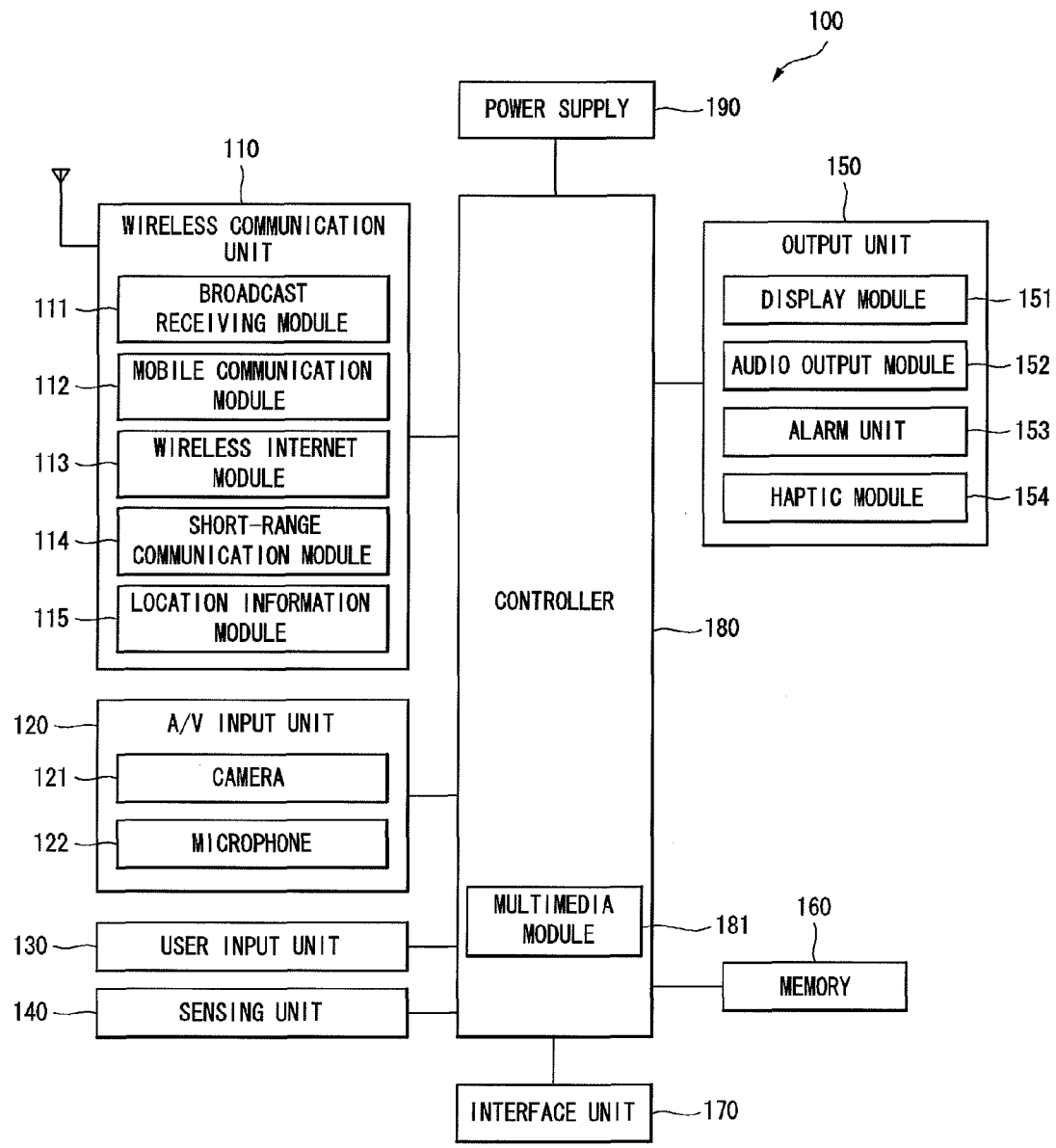
FIG. 1 is a block diagram of a mobile terminal according to an embodiment of the present invention.

FIG. 1 is a block diagram of a mobile terminal 100 according to an embodiment of the present invention. Other embodiments, configurations and arrangements may also be provided. As shown, the mobile terminal 100 may include a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 may be essential parts and the number of components included in the mobile terminal 100 may be varied. The components of the mobile terminal 100 will now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short-range communication module 114, and a location (or position) information module 115.

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short-range communication module 114 may correspond to a module for local area communication. Further, Bluetooth®, radio frequency identification (RFID), infrared data association (IrDA), ultra wideband (UWB) and/or Zig-Bee® may be used as a local area communication technique.

The position information module 115 may confirm or obtain the position of the mobile terminal 100. The position information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is a representative example of the position information module 115. The GPS module may calculate information on distances between one point or object and at least three satellites and information on a time when the distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. In addition, the GPS module may continuously calculate the current position in real time and calculate velocity information using the location or position information.

As shown in FIG. 1, the A/V input unit 120 may input an audio signal or a video signal and include a camera 121 and a microphone 122. The camera 121 may process image frames of still images or moving images obtained by an image sensor in a video telephony mode or a photographing mode. The processed image frames may be displayed on a display module 151 which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode or a speech recognition mode and process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (e.g., constant voltage/capacitance), a jog wheel, a jog switch and so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and generate a sensing signal for controlling operation of the mobile terminal 100. For example, in case of a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the mobile terminal 100. The display module 151 may display a user interface (UT) or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

In addition, the display module 151 may include at least one of a liquid crystal display, a thin film transistor liquid crystal display, an organic light-emitting diode display, a flexible display and a three-dimensional display. Some of these displays may be of a transparent type or a light transmissive type. That is, the display module 151 may include a transparent display.

The transparent display may include a transparent liquid crystal display. The rear structure of the display module 151 may also be of a light transmissive type. Accordingly, a user may see an object located behind the body of the mobile terminal 100 through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

Further, when the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the mobile terminal 100, surrounded by the touch screen, or near the touch screen. The proximity sensor 141 may sense an object approaching a predetermined sensing face or an object located near the proximity sensor using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of convenience of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and the like. The audio output module 152 may output sounds through an earphone jack. The user may hear the sounds by connecting an earphone to the earphone jack.

The alarm unit 153 may output a signal for indicating generation of an event of the mobile terminal 100. For example, alarms may be generated when receiving a call signal, receiving a message, inputting a key signal, or inputting touch. The alarm unit 153 may also output signals in forms different from video signals or audio signals, for example, a signal for indicating generation of an event through vibration. The video signals or the audio signals may also be output through the display module 151 or the audio output module 152.

The haptic module 154 may generate various haptic effects that the user can feel. One example of the haptic effects is vibration. The intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operation of the controller 180 and temporarily store input/output data such as a phone book, messages, still images, and/or moving images. The memory 160 may also store data about vibrations and sounds in various patterns that are output from when a touch input is applied to the touch screen.

The memory 160 may include at least a flash memory a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk or an optical disk. The mobile terminal 100 may also operate in relation to a web storage performing the storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and a universal subscriber identify module (USIM). An identification device including the user identification module may also be manufactured in the form of a smart card. Accordingly, the identification device may be connected to the mobile terminal 100 through a port of the interface unit 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing and/or recording multimedia. The multimedia module 181 may be included in the controller 180 as shown in FIG. 1 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented by the controller 180.

According to software implementation, embodiments such as procedures or functions may be implemented with a separate software module executing at least one function or operation. Software codes may be implemented according to a software application written in an appropriate software language. The software codes may be stored in the memory 160 and executed by the controller 180.

Figure 2A:
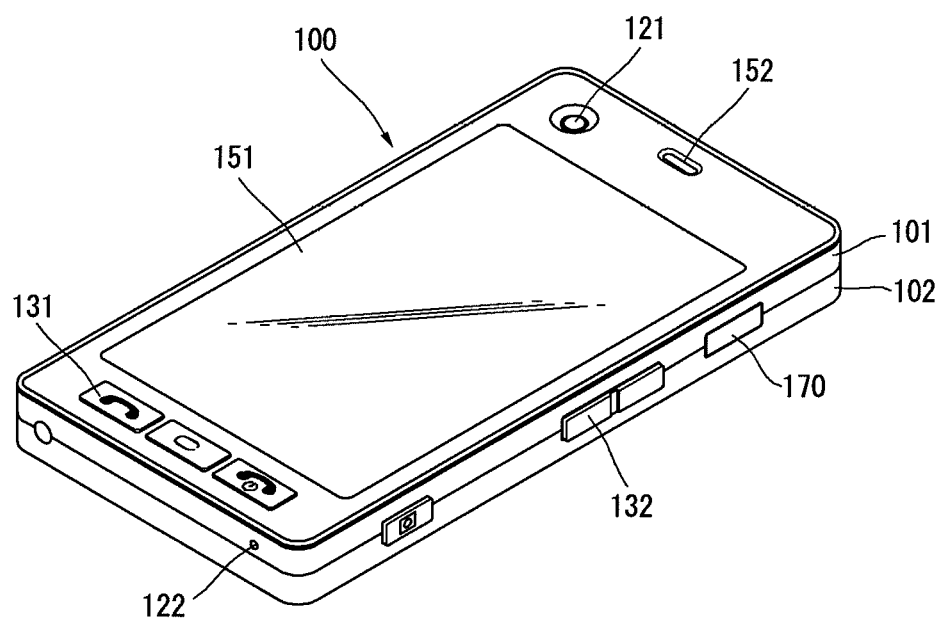
FIG. 2A is a front perspective view of the mobile terminal according to an embodiment of the present invention.

FIG. 2A is a front perspective view of the mobile terminal or a mobile terminal 100 according to an embodiment of the present invention.

The mobile terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics or other material through injection molding or made of a metal material such as stainless steel (STS) or titanium (Ti) or other metals.

The display module 151, the audio output module 152, the camera 121, the user input unit 130/131 and 132, the microphone 122 and the interface unit 170 can be arranged in the terminal body, specifically, in the front case 101.

The display module 151 occupies most part of the main face of the front case 101. The audio output module 152 and the camera 121 are arranged in a region in proximity to one of both ends of the display module 151 and the user input unit 131 and the microphone 122 are located in a region in proximity to the other end of the display module 151. The user input unit 132 and the interface unit 170 are arranged on the sides of the front case 101 and the rear case 102.

The user input unit 130 is operated to receive commands for controlling the operation of the mobile terminal 100 and can include a plurality of user input units 131 and 132. The user input units 131 and 132 can be referred to as manipulating portions and employ any tactile manner in which a user operates the user input units 131 and 132 while having tactile feeling.

First and second user input units 131 and 132 can receive various inputs. For example, the first user input unit 131 receives commands such as start, end and scroll and the second user input unit 132 receives commands such as control of the volume of sound output from the audio output module 152 or conversion of the display module 151 to a touch recognition mode.

Figure 2B:
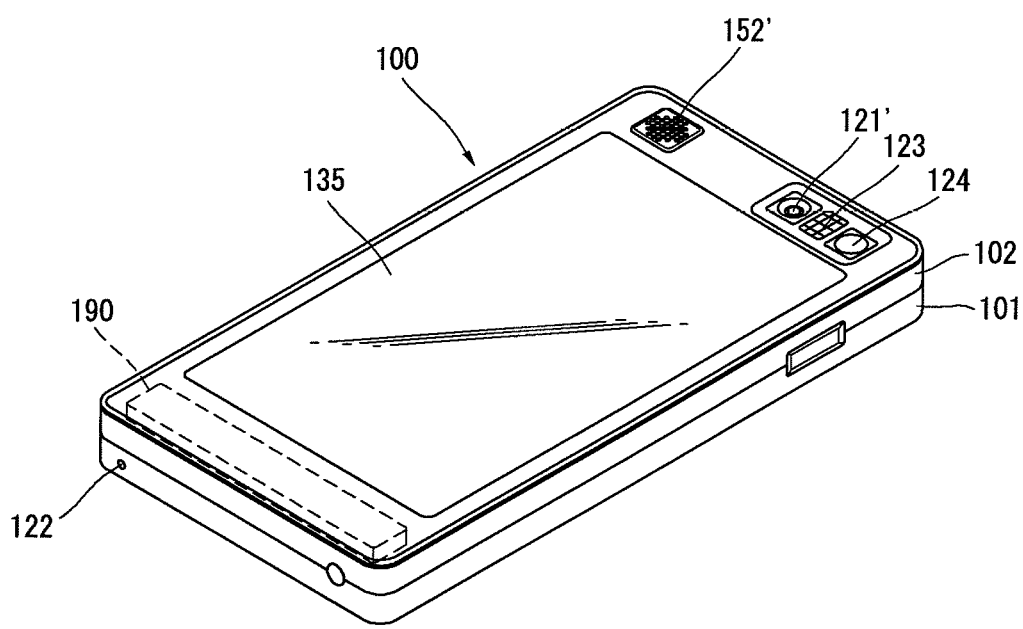
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2B, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2B.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output module 152' can be additionally provided on the rear side of the terminal body. The audio output module 152' can achieve a stereo function with the audio output module 152 shown in FIG. 2A and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna can be pulled out of the terminal body.

The power supply 190 for providing power to the mobile terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display module 151. In this case, if the display module 151 outputs visual information through both sides thereof, the visual information can be recognized through the touch pad 135. The information output through both sides of the display module 151 can be controlled by the touch pad 135. Otherwise, a display is additionally attached to the touch pad 135 such that a touch screen can be arranged even in the rear case 102.

The touch pad 135 operates in connection with the display module 151 of the front case 101. The touch pad 135 can be located in parallel with the display module 151 behind the display module 151. The touch panel 135 can be identical to or smaller than the display module 151 in size.

Figure 2C:
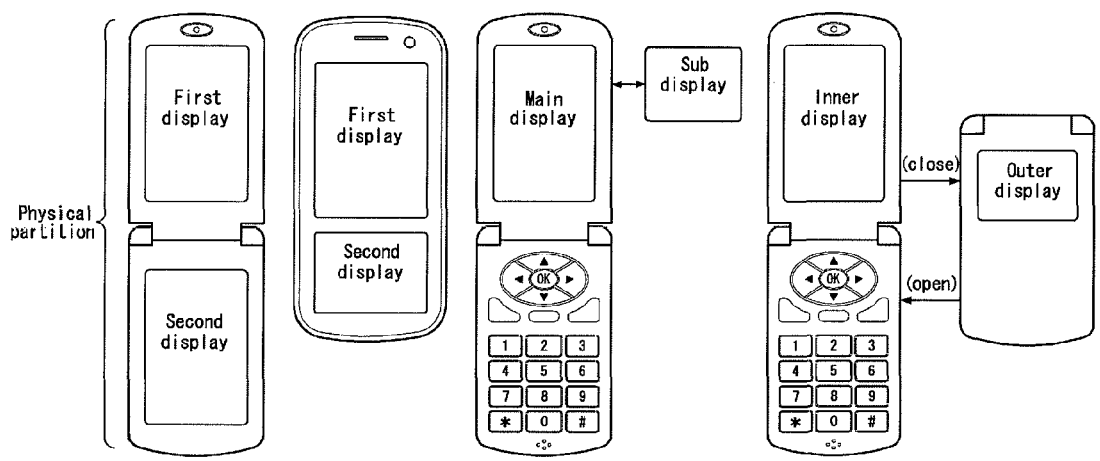
FIGS. 2C and 2D illustrate forms of the mobile terminal and display screens according to various embodiments of the present invention.
Figure 2D:
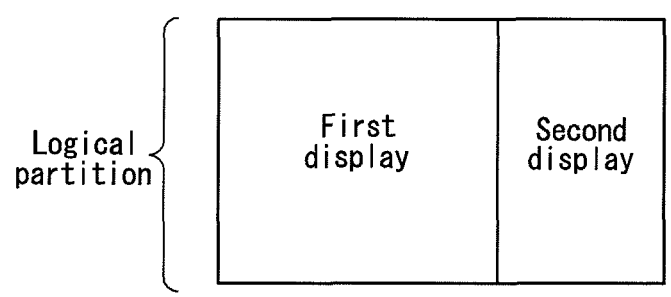

FIGS. 2C and 2D illustrate the mobile terminal 100 and the display module 151 according to various embodiments of the present invention.

Referring to FIG. 2C, the display module 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display module 151 can include first and second displays which are logically separated from each other in a display panel, as illustrated in FIG. 2D.

Figure 3:
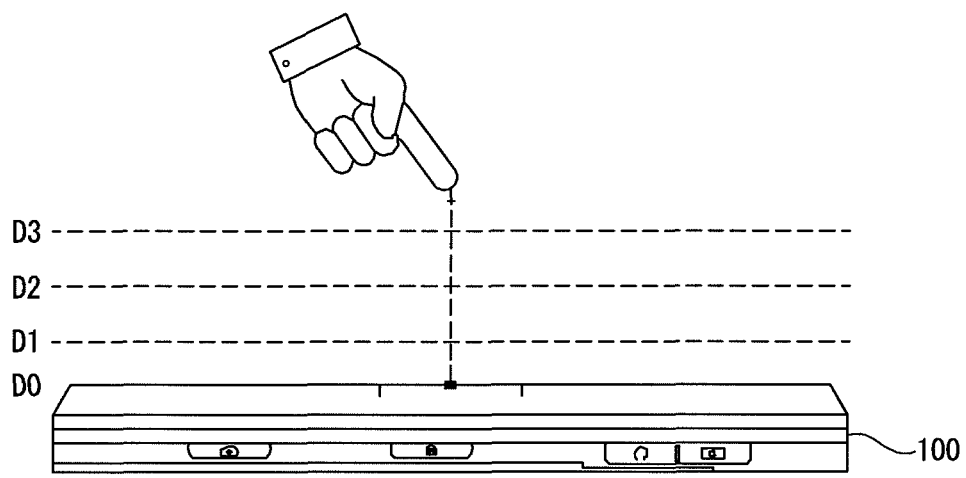
FIG. 3 is a conceptual view for explaining a proximity depth of a proximity sensor.

FIG. 3 is a conceptual view for explaining a proximity depth of the proximity sensor included in the mobile terminal according to an embodiment of the present invention.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
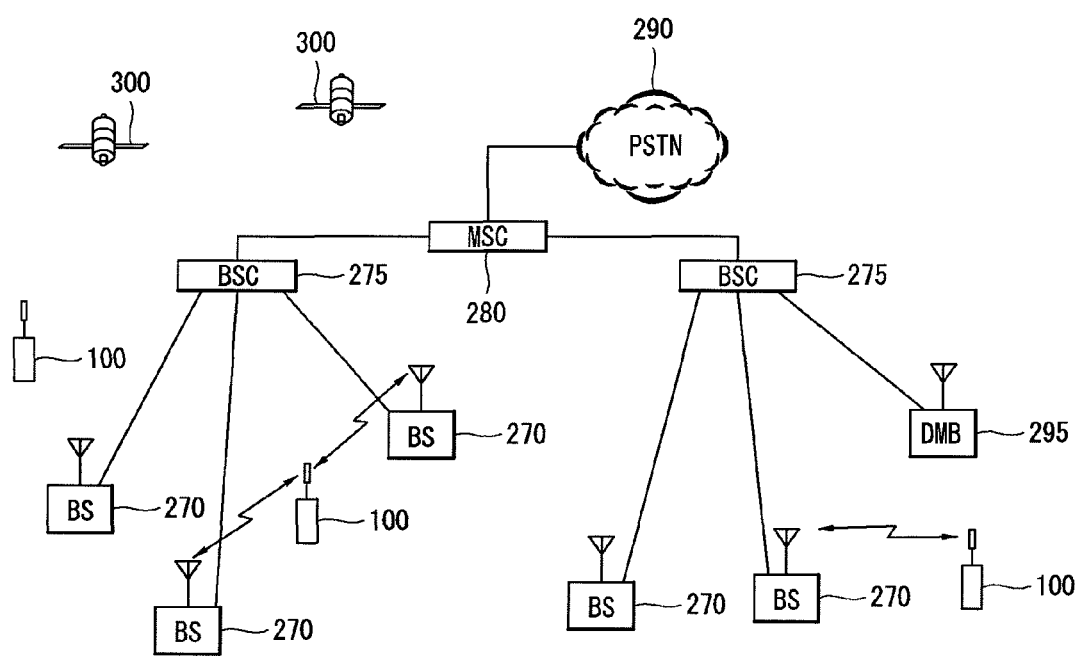
FIG. 4 illustrates an example of a configuration of a CDMA wireless communication system communicating with the mobile terminal shown in FIG. 1.

Referring to FIG. 4, a CDMA wireless communication system includes mobile terminals 100, base stations 270, base station controllers 275, and a mobile switching center 280. The mobile switching center 280 is connected to a public switch telephone network (PSTN) 290. The mobile switching center 280 is connected to the base station controllers 275. The base station controllers 275 are connected to the base stations 270 through backhaul lines. The backhaul lines may be constructed according to E1/T1, ATM, IP, PPP, frame relay, HDSL, ADSL or xDSL well-known in the art. The CDMA wireless communication system may include at least two base station controllers 275.

Each base station 270 may include a sector or sectors and each sector may include an omnidirectional antenna or an antenna adjusted to a specific radiation direction from the base station 270. Otherwise, each sector may include two diversity reception antennas. Each base station 270 is constructed to have frequency assignments, and the frequency assignments may have specific spectra (for example, 1.25 MHz and 5 MHz).

Intersection of sectors and frequency assignments may be referred to a CDMA channel.

The base stations 270 may be referred to as base station transceiver subsystems (BTSs). "Base station" may be used as a term that collectively designates the base station controller 275 and one or more base stations 270 in several examples. Furthermore, the base stations 270 may be referred to as "cell sites". Otherwise, individual sectors of a given base station 270 may be referred to as cell sites.

A terrestrial DMB transmitter 295 can transmit broadcasting signals to the mobile terminals 100 operating in the CDMA wireless communication system. The broadcasting receiving module 111 of each mobile terminal 100 is constructed to receive the broadcasting signals transmitted from the DMB transmitter 295. This can be similarly applied to different types of broadcast and multicast signaling as described above.

FIG. 4 illustrates an example of global positioning system (GPS) satellites 300. These satellites 300 can track the positions of some or all of the mobile terminals 100. Although two satellites are shown in FIG. 4, position information can be obtained from less than or more than two satellites. In addition, other position-tracking techniques (for example, position-tracking techniques that can substitute for GPS technique or can be added to the GPS technique) can be used. If required, some or all of the GPS satellites 300 can support satellite DMB transmission separately or additionally.

When the CDMA wireless communication system operates, the base stations 270 receive reverse link signals from the mobile terminals 100. The mobile terminals 100 may be in a state that the mobile terminals 100 are making calls, sending messages or performing other communications. The reverse link signals received by the base stations 270 are processed by the base stations 270. The processed data is transmitted to the base station controllers 275 connected to the base stations 270. The base station controllers 275 provide call resource allocation and mobility management functionality including soft handoffs between the base stations 270. Furthermore, the base station controllers 275 transmit the received data to the mobile switching center 280. The mobile switching center 280 provides additional routing services for interfacing with the PSTN 290. Similarly, the PSTN 290 interfaces with the mobile switching center 280, and the mobile switching center 280 interfaces with the base station controllers 275. The base station controllers 275 control the base stations 270 to transmit forward link signals to the mobile terminals 100.

Figure 5:
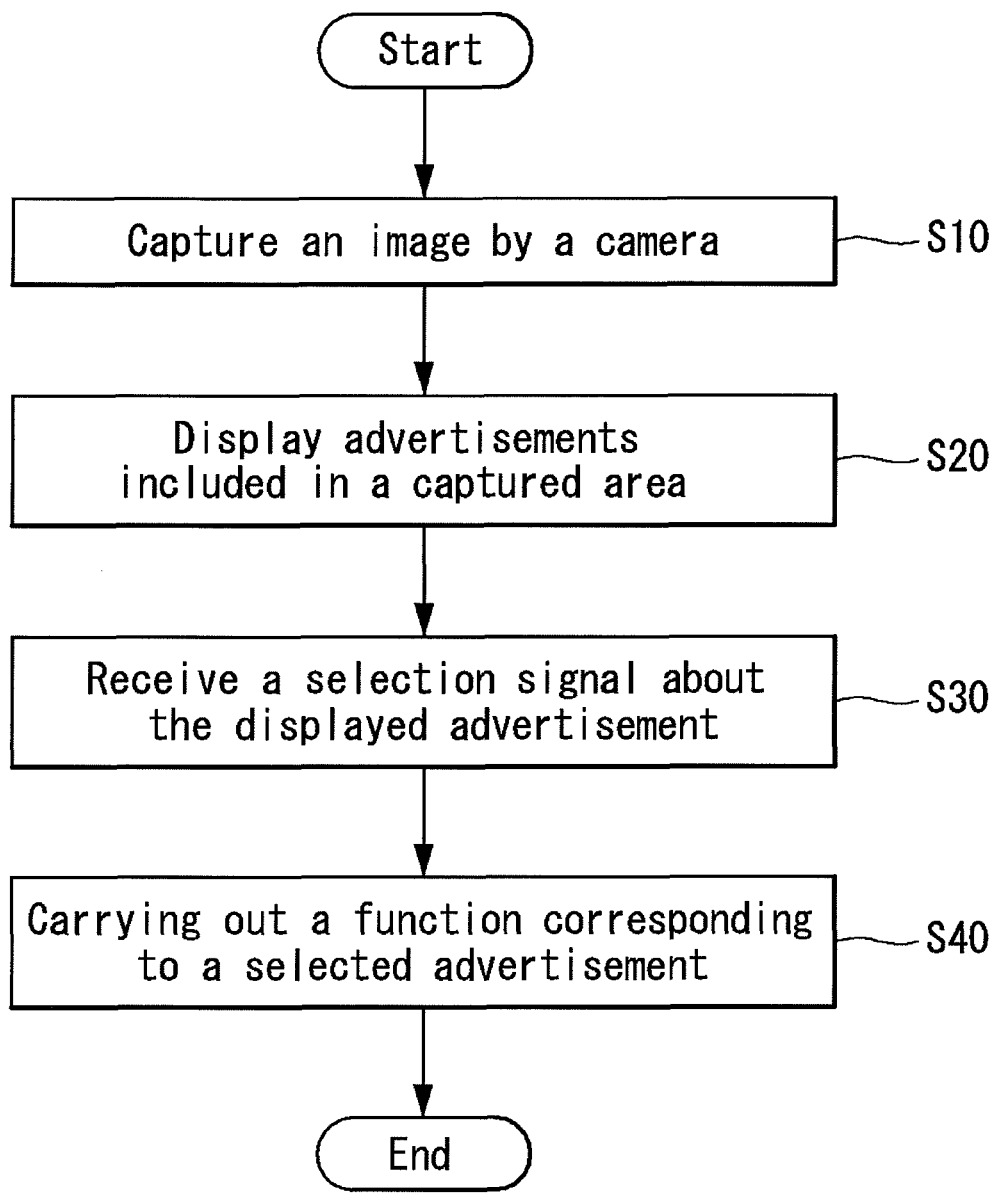
FIG. 5 is a flow chart illustrating a procedure of operation of a mobile terminal according to one embodiment of the present invention.
Figure 6:
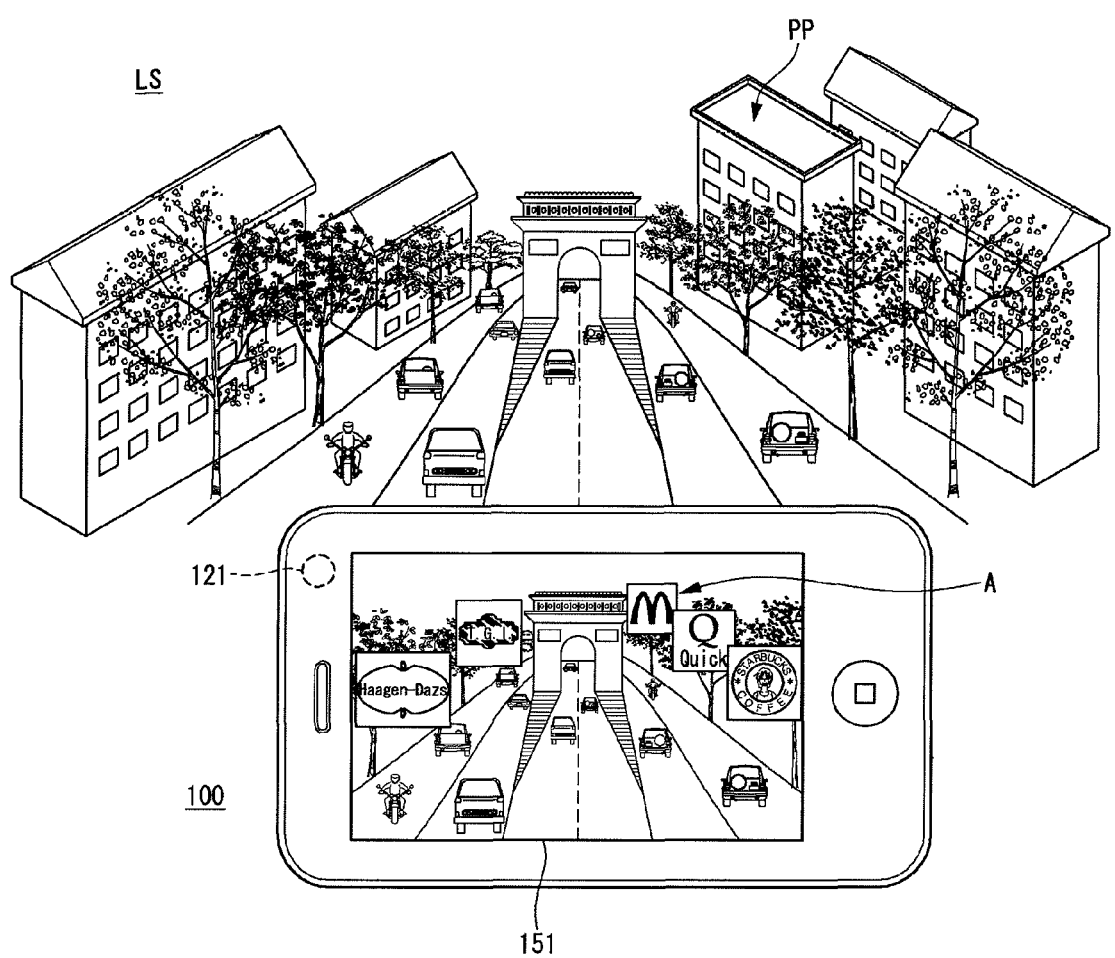
FIG. 6 illustrates an example of the operation of the mobile terminal of FIG. 5.

FIG. 5 is a flow chart illustrating a procedure of operation of a mobile terminal according to one embodiment of the present invention; and FIG. 6 illustrates an example of the operation of the mobile terminal corresponding to the method of FIG. 5.

As shown in the figures, the mobile terminal 100 according to one embodiment of the present invention can include a step S10 of capturing an image by using a camera 121. Here, the mobile terminal 100 can be one of the mobile terminals discussed in the preceding paragraphs.

The camera 121 can be disposed in the front or rear of the mobile terminal 100. The camera disposed in the front or rear of the mobile terminal 100, as described above, can be denoted by a drawing symbol 121 or 121'. In what follows, however, for the convenience of understanding, it is assumed that the drawing symbol 121 denotes a camera. It should be noted, however, that the denotation above does not limit the position of the camera 121 to a particular one.

The camera 121 can be activated or deactivated according to the operation of the user or the control operation of the controller (180 of FIG. 1). For example, the controller (180 of FIG. 1) can activate or deactivate the camera 121 according to a sensing value of an orientation detection sensor which can sense the pose of the mobile terminal 100. The orientation detection sensor is a part of the sensing unit (140 of FIG. 1) and can be any one of an acceleration sensor, a gravity sensor, and a geomagnetic sensor or a combination of two or more of the above. By using the orientation detection sensor which is composed of any one of the acceleration sensor, the gravity sensor, and the geomagnetic sensor or a combination of two of more of the above, the controller (180 of FIG. 1) can determine a looking direction of a surface of the mobile terminal 100 where the camera 121 is positioned. For example, the controller (180 of FIG. 1) can determine whether the surface of the mobile terminal 100 where the camera 121 is facing the ground plane or the front/rear parallel to the ground plane. If it is determined that the camera 121 is facing the ground plane, the controller (180 of FIG. 1) can stop image capture by deactivating the camera 121. In the same way, if it is determined that the camera 121 is facing the front/rear parallel to the ground plane, the controller (180 of FIG. 1) can start image capture by activating the camera 121. Since the controller (180 of FIG. 1) can activate or deactivate the camera 121 according to the orientation sensed by the orientation detection sensor, the user can carry out optimized image capture without applying separate operation. In addition, battery consumption can be minimized by making the camera 121 operate at an optimized instant.

If image capture through the camera 121 is started, a step S20 of displaying advertisements contained in a captured area can be carried out.

A captured area can indicate the area among an actual area LS captured as the camera 121 operates. The captured area can be different from the actual area LS depending on inherent characteristics of the camera 121 including field of view, focal length, and the like. The captured image obtained by the camera 121 can be displayed on the display module 151.

The controller (180 of FIG. 1) can display an advertisement image A contained in a captured area at the same time of displaying a captured image on the display module 151. The advertisement image A can be related to a particular point of purchase (PP) belonging to a captured area. For example, if a shop selling hamburgers is located in the captured area, the shop can correspond to a particular PP.

The controller (180 of FIG. 1) can determine a particular PP located in a captured area from photographing direction of the camera 121 and relative position thereof with respect to the mobile terminal 100. As described above, the photographing direction and the position of the mobile terminal 100 can be known from an orientation detection sensor, a GPS sensor, and so on. For example, the controller (180 of FIG. 1) can determine that the mobile terminal 100 is positioned at (x1, y1) on the ground and photographing towards the north. Once figuring out such a fact, information about the PP located in the corresponding direction can be wirelessly obtained through a remote server (S in FIG. 8). In other words, an advertisement image A corresponding to a point of purchase (PP) can be wirelessly obtained from the remote server.

If the advertisement image A corresponding to the PP is wirelessly obtained from the remote server, the controller (180 of FIG. 1) can display the advertisement image A on the display module 151 by adding perspective to the advertisement image. For example, an advertisement image A corresponding to a nearby PP can be displayed in larger size while an advertisement image A to a distant PP in a smaller size, as seen in FIG. 6.

The advertisement image A displayed on the display module 151 can make use of augmented reality (AR) techniques. For example, the display of the advertisement image can be changed in real-time according to photographing direction, photographing angle, movement of the display module 151 along a path, etc. On the other hand, information about a PP can further include a numeric key (NK, discussed below relative to FIG. 14) of the PP.

The numeric key (NK, discussed below relative to FIG. 14) can be a unique code assigned to a particular point of purchase (PP) to be distinguished from the other PPs. If the user selects an advertisement image A corresponding to a particular PP, a numeric key (NK) corresponding to the advertisement image A can be transmitted to a server (S of FIG. 8). If a particular numeric key (NK) is received from a particular user, the server (S, discussed below relative to FIG. 8) can know that the particular user has selected and recognized the particular advertisement.

The controller (180 of FIG. 1) can display an advertisement image A according to predetermined criteria as follows. For example, an advertisement image A selected once can be made not to be selected again within a predetermined period of time; and even if advertisement image A is selected again within the predetermined period of time, points can be prevented from accumulating doubly. Also, an advertisement image A selected once can be made not to be displayed again on the display module 151 within a predetermined period of time. Furthermore, the controller (180 of FIG. 1) can display an advertisement image A only if particular conditions set by the user are met. For example, only advertisement images A which provide points when they are selected can be made to be displayed.

If the advertisement contained in the captured area is displayed, a step of receiving a selection signal for the displayed advertisement S30 and a step of carrying out a function corresponding to a selected advertisement S40 can be performed.

If an advertisement image A is displayed on the display module 151, the user can select the displayed advertisement image A. Selection of the advertisement image A can be made through a touch on or near the displayed advertisement image A. For example, through a motion of touching one point inside the advertisement image A or a motion of drag touching along an outline of the advertisement image A. Selection of an advertisement image A will be described in more detail below.

If a particular advertisement image A is selected, the controller (180 of FIG. 1) can carry out a function corresponding to the selected advertisement (S40). For example, a function of transmitting to the server (S of FIG. 8) the fact that the user has selected a particular advertisement can be performed or a function of changing the display status of the particular advertisement can be performed. Examples of functions corresponding to a selected advertisement will be described in more detail below.

Figure 7:
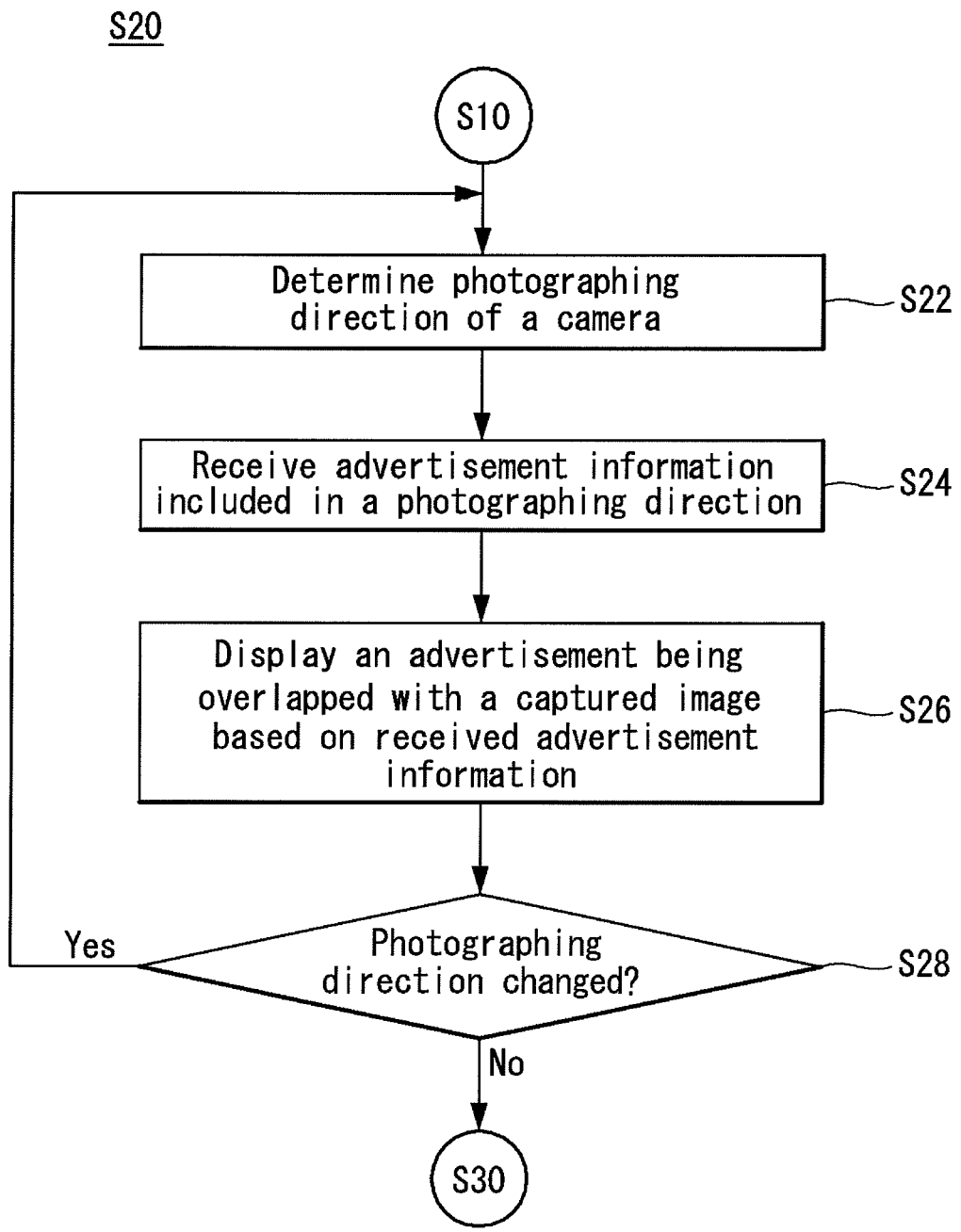
FIG. 7 is a flow chart specifically illustrating a procedure for displaying advertisements contained in a captured area according to FIG. 5.
Figure 8:
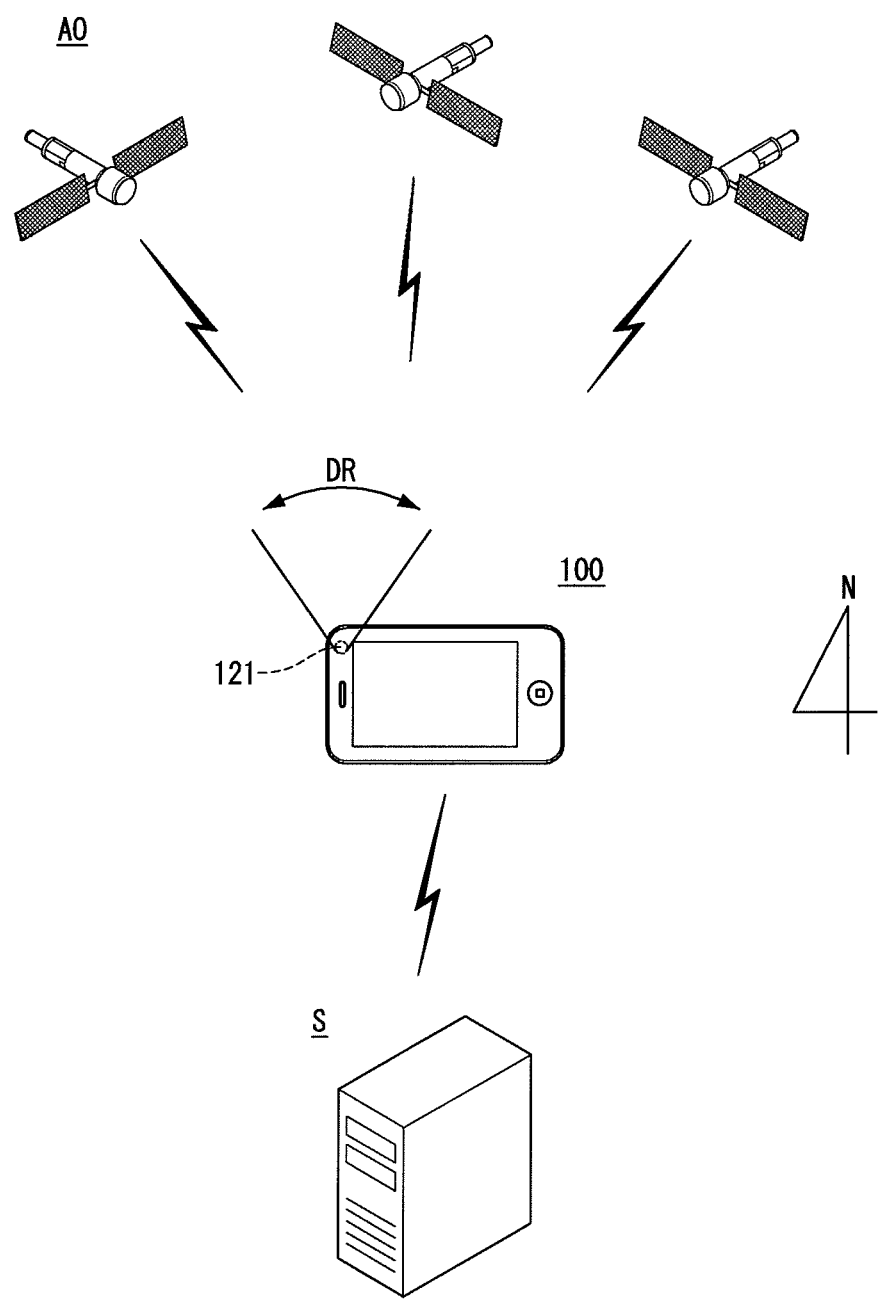
FIG. 8 illustrates an example of the operation of the mobile terminal of FIG. 7.

FIG. 7 is a flow chart specifically illustrating a procedure for displaying advertisements contained in a captured area according to FIG. 5; and FIG. 8 illustrates an example of the operation of a mobile terminal corresponding to the method of FIG. 7.

As shown in FIG. 7, a step (S20 of FIG. 5) of displaying an advertisement contained in an area captured by a mobile terminal 100 according to one embodiment of the present invention can include a step S22 of determining a photographing direction of the camera 121.

The photographing direction of the camera 121 can be determined by using an orientation detection sensor, a GPS sensor, and the like contained in the sensing unit (140 of FIG. 1). A GPS sensor is a device which receives signals from orbiting satellites AO. Through the GPS sensor, an absolute position of the mobile terminal 100 on the earth surface can be determined. As a result, through a current position of the mobile terminal 100 and an azimuth angle of the camera 121 obtained by the sensing results of the sensing unit (140 of FIG. 1), the photographing direction of the camera 121 can be determined.

A step S24 of wirelessly receiving, from a remote server, advertisement information contained in a photographing direction can be carried out.

Once a photographing direction is determined, a particular point of purchase (e.g., PP of FIG. 6) belonging to the direction can be known. In other words, information about a point of purchase (PP of FIG. 6) belonging to a particular photographing direction can be obtained through a wireless connection to a remote server S. Moreover, if the information was previously received and stored in the memory (160 of FIG. 1), information stored in the memory (160 of FIG. 1) can also be used. As described above, the advertisement information can include an advertisement image (A of FIG. 6) and a numeric key (NK of FIG. 14) corresponding to a particular point of purchase (PP of FIG. 6).

If advertisement information contained in a photographing direction is received, a step of displaying advertisements overlaid on or overlapped with a captured image can be carried out based on the received advertisement information (S26).

The image obtained by the camera 121 is an image about objects. Therefore, an object is reflected as seen by the camera 121 but specific information about the object cannot be obtained. When the user of the mobile terminal 100 takes a picture towards the front and tries to look for a restaurant contained in a captured image, various other objects in addition to the restaurant can also be contained in the image captured through the camera 121. In this case, the restaurant which the user tries to find may not be easily found. By displaying an advertisement image being overlaid with an image captured through the camera 121, the controller (180 of FIG. 1) of the mobile terminal 100 according to one embodiment of the present invention can help the user easily find the advertisement information which he or she wants.

An advertisement can be displayed to provide perspective being overlaid with a point of purchase (PP of FIG. 6) captured by the camera 121. Therefore, the user can see an advertisement image integrated with an image captured through the camera 121.

A step of determining whether a photographing direction has been changed can also be carried out (S28).

A photographing direction can be changed if the user rotates the body of the mobile terminal 100 in a left or right direction DR. The orientation sensor of the sensing unit (140 of FIG. 1) can detect in which direction the body of the mobile terminal 100 has rotated. If the photographing direction is changed, the photographing direction of the camera 121 is determined again and a display screen can be composed according to the change of the photographing direction.

Figure 9:
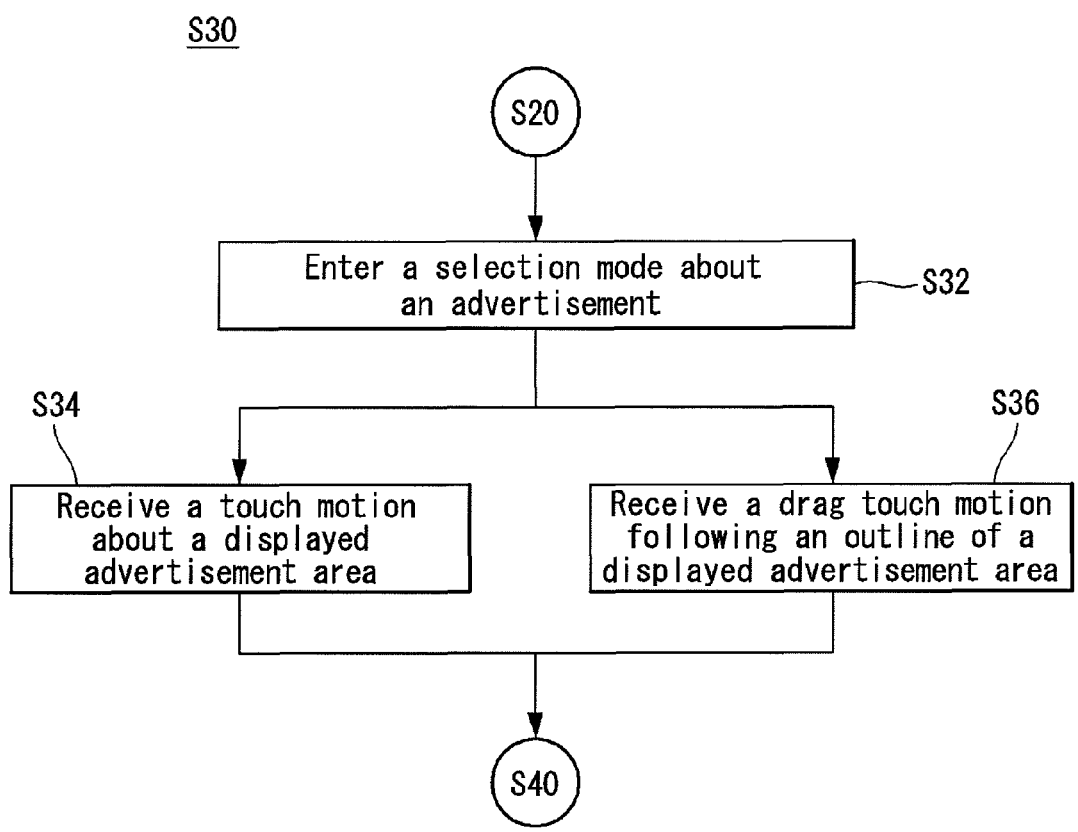
FIG. 9 is a flow chart specifically illustrating a procedure for receiving a selection signal about displayed advertisements according to FIG. 5.
Figure 10:
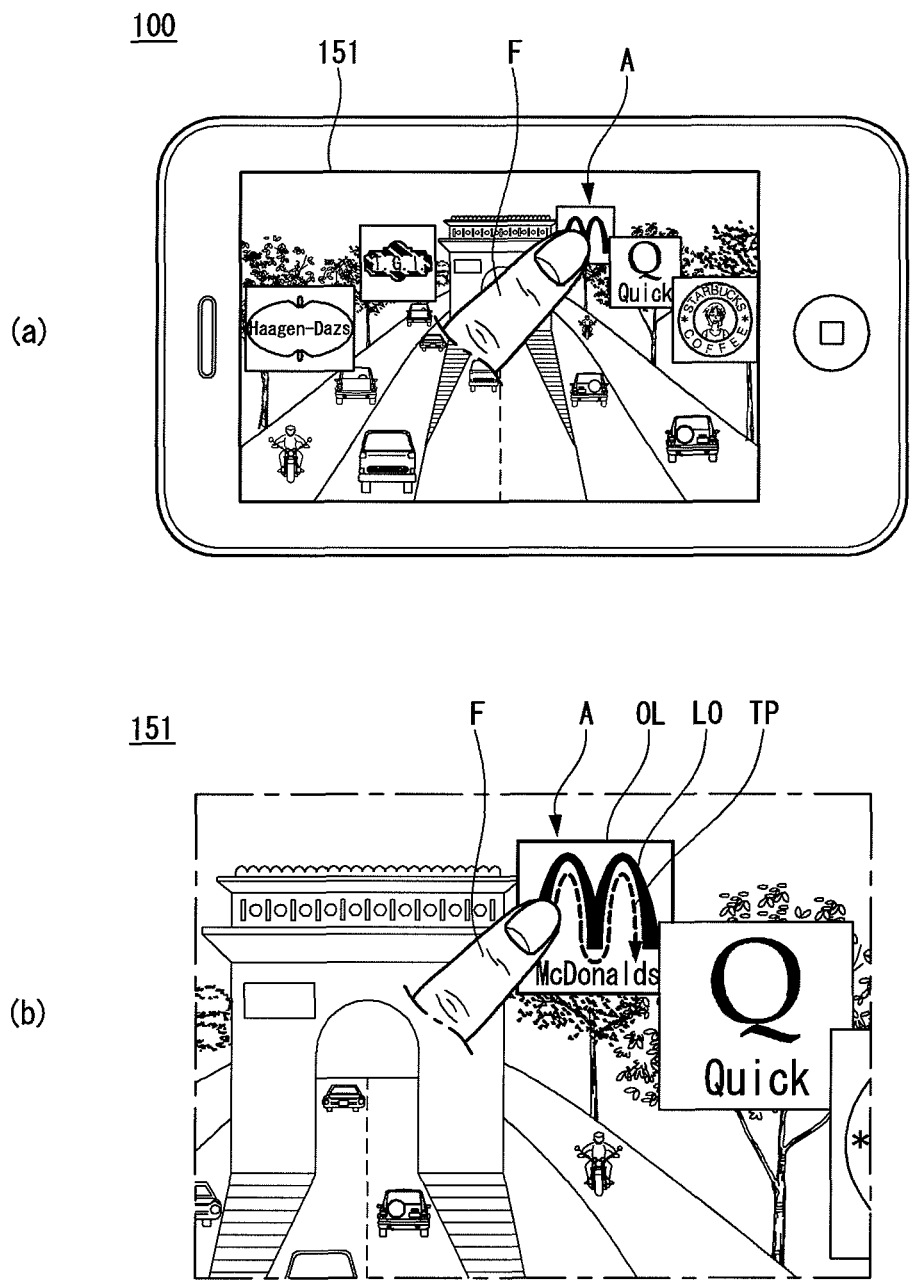
FIG. 10 illustrates an example of the operation of the mobile terminal of FIG. 9.

FIG. 9 is a flow chart specifically illustrating a procedure for receiving a selection signal about displayed advertisements according to FIG. 5; FIG. 10 illustrates an example of the operation of a mobile terminal according to the method of FIG. 9.

As shown in the figures, a step (S30 of FIG. 5) of receiving a selection signal about an advertisement displayed on the mobile terminal 100 according to one embodiment of the present invention can include a step S32 of entering a selection mode about the advertisement.

Selecting a mode for an advertisement can be carried out after the advertisement image A is displayed on the display module 151. In other words, if the image captured by the camera 121 and the obtained advertisement image A have been already displayed on the display module 151, selecting a mode for the displayed advertisement image can be carried out. Selection of an advertisement can be carried out by a touch, which is described in detail in the following.

Selection of an advertisement can be carried out by a step S34 of receiving a touch motion about a displayed advertisement area.

A touch motion about the displayed advertisement area can be a motion of releasing a touch after touching one point of the advertisement image A. That is to say, the touch motion can indicate a motion of releasing a touch at the point touched again but without a movement after a touch.

As shown in FIG. 10(a), the user can touch the advertisement image A by using his or her finger F. The controller (180 of FIG. 1), if a touch motion is received from the user, can determine that the advertisement image A including the position of the touch motion has been selected.

Selection of an advertisement can be carried out by a step S36 of receiving a drag touch motion. One example of a drag motion is a motion following the outline of the displayed advertisement area. Another example of a drag motion is a complete or partial encirclement of all or part of the displayed advertisement area. Another example of a drag motion is a check, slash or other drag motion on all or part of the displayed advertisement area.

The drag touch motion following the outline of the displayed advertisement area can be a series of drag touch motions along the outline of the advertisement image A itself or along the outline of a particular shape LO included in the advertisement image A.

As shown in FIG. 10(b), if the user performs a first drag touch TP (e.g., following the outline of a particular shape LO included in an advertisement image A), the controller (180 of FIG. 1) determines that the advertisement image A has been selected. By guiding the user to directly touch a shape LO which follows a product name of a particular company, an advertisement effect on the user can be increased. Meanwhile, the controller (180 of FIG. 1) can guide the user to perform a touch motion following the outline of a particular shape LO by displaying a trajectory along which the first drag touch TP should be carried out on the display module 151 beforehand in the form of a dotted line or the like.

Figure 11:
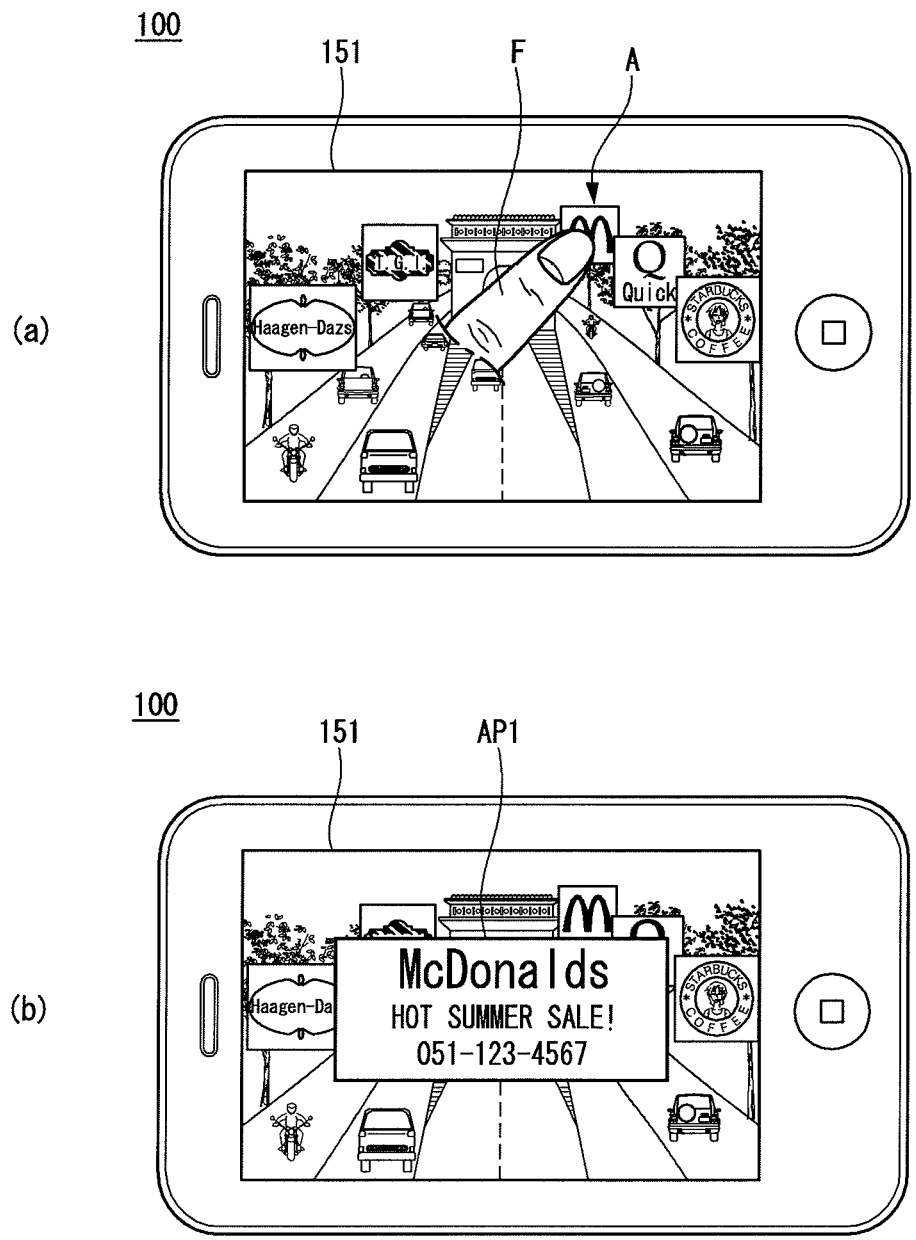
FIG. 11 illustrates an example of the operation of a mobile terminal according to FIG. 5.

FIG. 11 illustrates an example of the operation of a mobile terminal according to the method of FIG. 5.

As shown in FIG. 11, if an advertisement image A is selected, the controller (180 of FIG. 1) of the mobile terminal 100 according to one embodiment of the present invention can display the corresponding specific information of the advertisement image A.

As shown in FIG. 11(a), the user can select the advertisement image A by using his or her finger F.

As shown in FIG. 11(b), the controller (180 of FIG. 1) can display specific information corresponding to the selected advertisement image A by using a first pop-up window AP1. The specific information can be obtained together at the same time when the information about the point of purchase (PP of FIG. 6) is obtained or when the user selects the advertisement image A. The specific information can include the name of a particular company, an advertising statement, a contact address, or other information.

Figure 12:
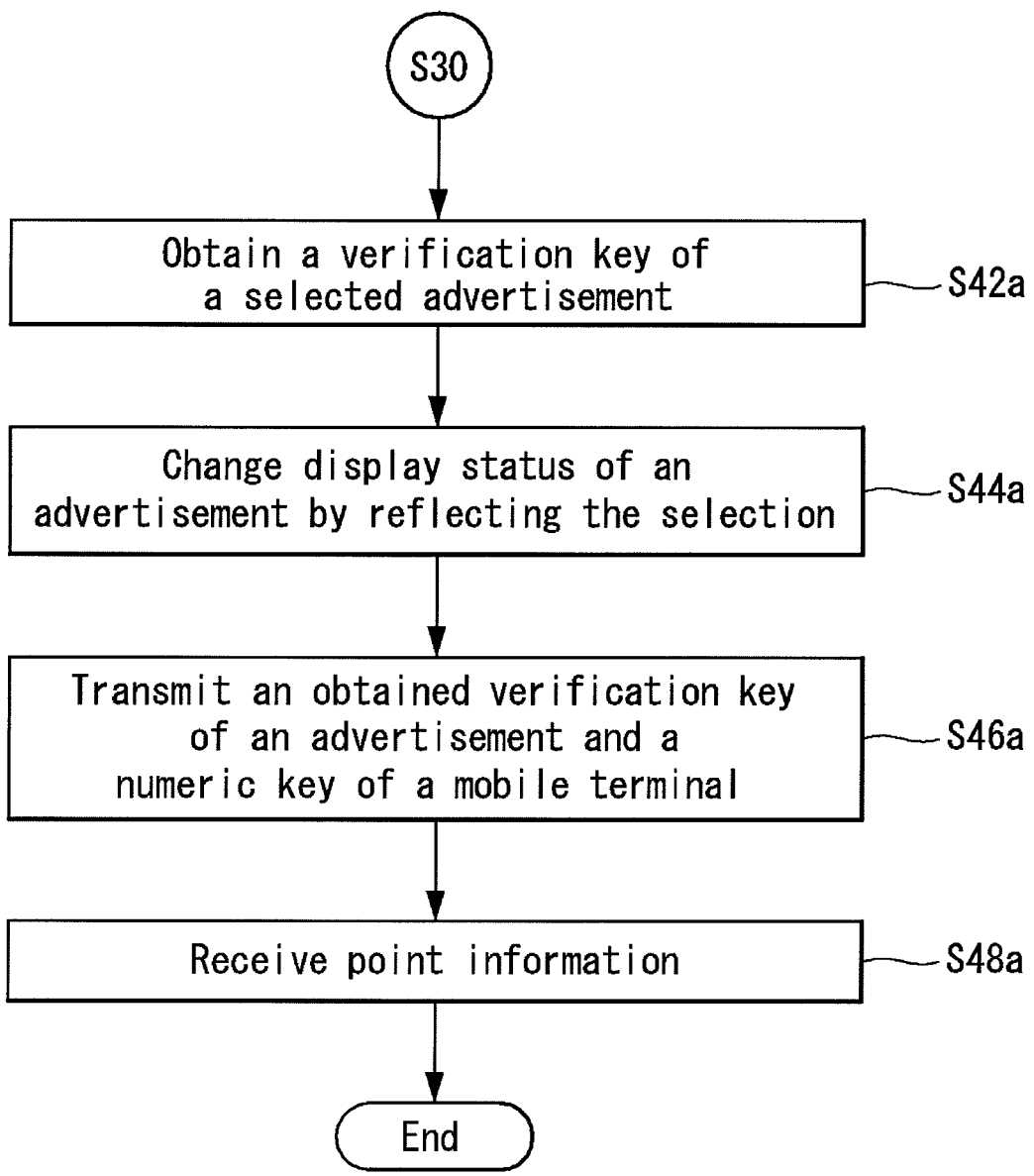
FIG. 12 is a flow chart specifically illustrating a procedure for carrying out a function corresponding to a selected advertisement according to FIG. 5.
Figure 14:
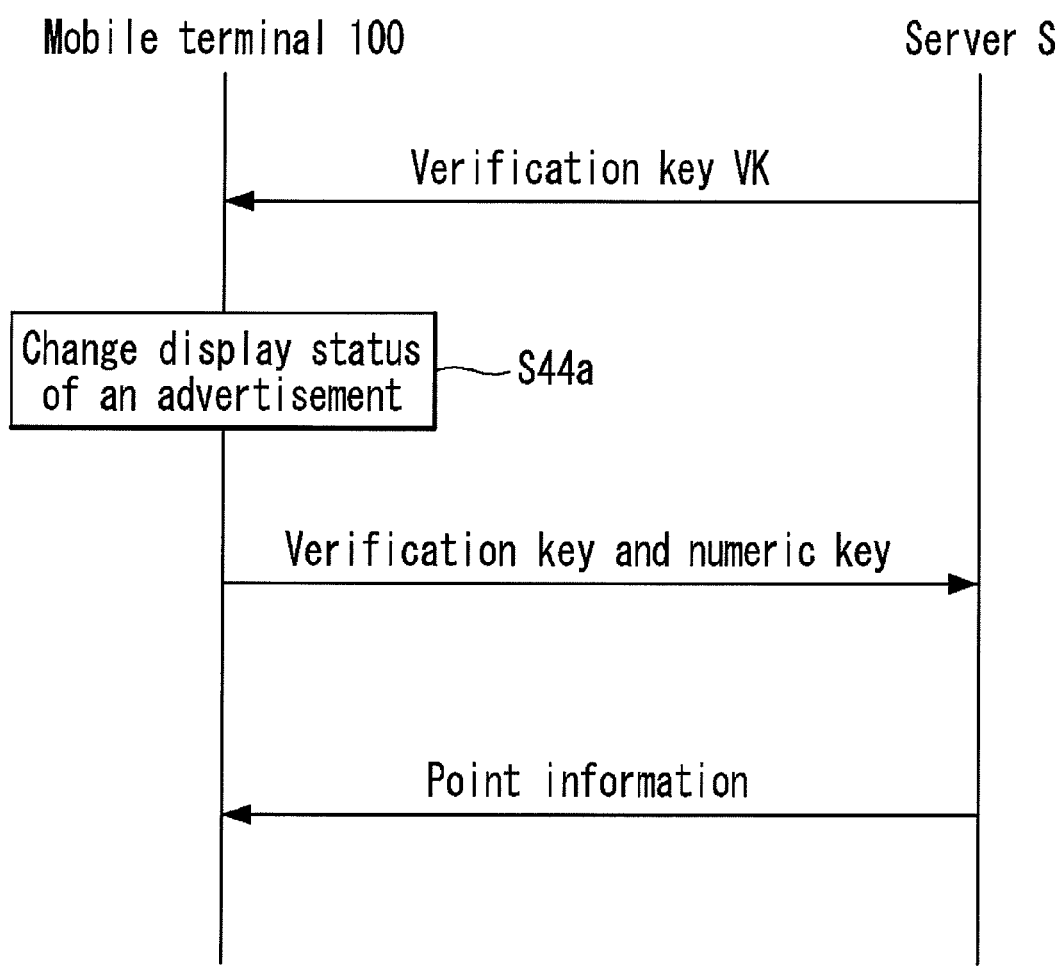

FIG. 12 is a flow chart specifically illustrating a procedure for carrying out a function corresponding to a selected advertisement according to FIG. 5; FIGS. 13 and 14 illustrate the operation of a mobile terminal corresponding to the method of FIG. 12.

As shown in the figures, the step (S40 of FIG. 5) of carrying out a function corresponding to a selected advertisement can include a step S42a of obtaining a verification key VK of the selected advertisement.

The verification key VK can be obtained from the server S if an advertisement is selected. The verification key VK can include a particular shop and a unique number of a company. The verification key VK can distinguish the advertisement image A selected by the user from the other advertisement images. In other words, the verification key VK can be a basis from which the server S can figure out which advertisement image A has been selected by the user.

A step S44a of changing the display status of an advertisement by reflecting a selected fact can be carried out.

If the user selects a particular advertisement image A, display of the selected advertisement image A can be changed from the display before the selection. Therefore, the user can intuitively recognize which advertisement image A he or she has selected.

As shown in FIG. 13(a), if an advertisement image A is selected, the size of the selected advertisement image A can be magnified. The advertisement image A, by applying an animation effect, can be magnified continuously from the initial size to the final size or in a discontinuous fashion from the initial size to the final size. Alternatively, the selected advertisement image A may be made to blink or to be animated so that the user can intuitively recognize that advertisement image A has been selected.

As shown in FIG. 13(b), if an advertisement image A is selected, a color of the selected advertisement image A can be changed. Also, it is possible for the color and the width of the outline of the advertisement image A to be changed so that the user can recognize the change according to the selection of the advertisement image A.

A step S46a of wirelessly transmitting a verification key VK of an obtained advertisement and a numeric key NK of the mobile terminal 100 to the remote server S can be carried out.

The numeric key NK is a value assigned to each mobile terminal 100. The numeric key NK can be assigned during manufacture of the mobile terminal 100. Also the numeric key NK can be assigned by the user, the remote server S, or the controller (180 of FIG. 1).

By wirelessly transmitting the verification key VK to the remote server S together with the numeric key NK, the remote server S can know which advertisement has been selected by the user of a particular mobile terminal 100.

A step S48a of wirelessly receiving point information from the remote server S can be carried out.

A point is a value given to the user of the mobile terminal 100 who has selected a particular advertisement image A. For example, it is possible that 1000 points have been assigned to a particular advertisement image A; if the user selects the advertisement image A, the user can obtain 1000 points. The user can accumulate points by selecting various advertisement images A and the accumulated points can be consumed in various ways including a discount of a product.

The point information PI can be wirelessly received from the remote server S by the user's selection or the control signal of the controller (180 of FIG. 1).

As a specific example of carrying out a function corresponding to a selected advertisement (40 of FIG. 5), using a verification key VK has been described. However, the specific example is only one embodiment of the present invention and whether the user is watching an advertisement can also be determined by various other methods. For example, it is possible to make the user go through a login process for a particular web site. If it is found that the user has logged on, based on the fact that the user has logged on without using a verification key VK and/or a numeric key NK, the remote server S can know that the user has watched a particular advertisement. Therefore, points can be provided for the user of a particular mobile terminal 100 who has logged on.

Figure 15:
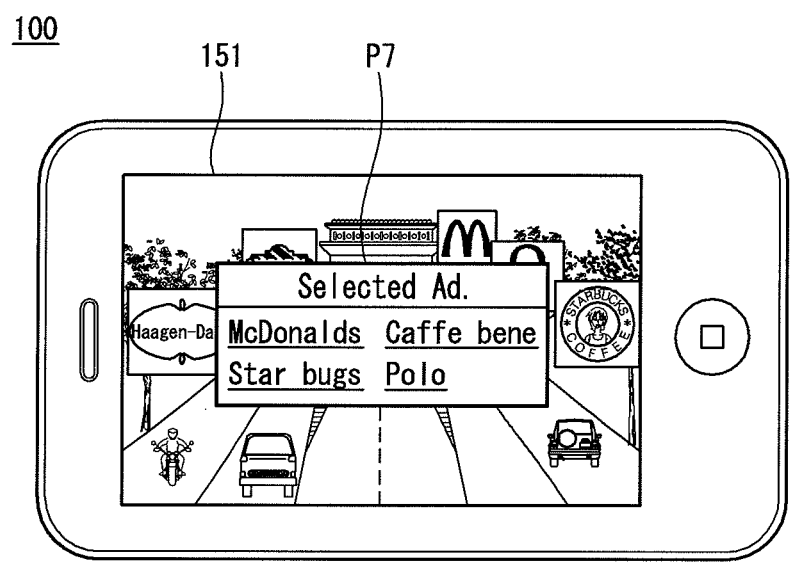
FIG. 15 illustrates an example of another example of the operation of a mobile terminal according to FIG. 12.

FIG. 15 illustrates an example of another example of the operation of a mobile terminal according to the method of FIG. 12.

As shown in FIG. 15, a mobile terminal 100 according to another operation example of the present invention can obtain connection information of a selected advertisement and store the connection information to the memory; and display the stored connection information on the display module 151 according to the user's selection or the control signal of the controller (180 of FIG. 1).

A seventh pop-up window P7 can be displayed according to the user's selection or control operation of the controller (180 of FIG. 1). Thus, the controller (180 of FIG. 1) can display connection information of an advertisement image (A of FIG. 6) which the user has selected already. That is to say, link information and the like about the advertisement image (A of FIG. 6) which the user has selected already can be displayed. If the user selects the displayed connection information, connection to the home page of the corresponding company can be made. As the connection information about the advertisement image (A of FIG. 6) which has been selected already is displayed on the display module 151, enhancement of user convenience and an advertisement effect can be anticipated.

Figure 16:
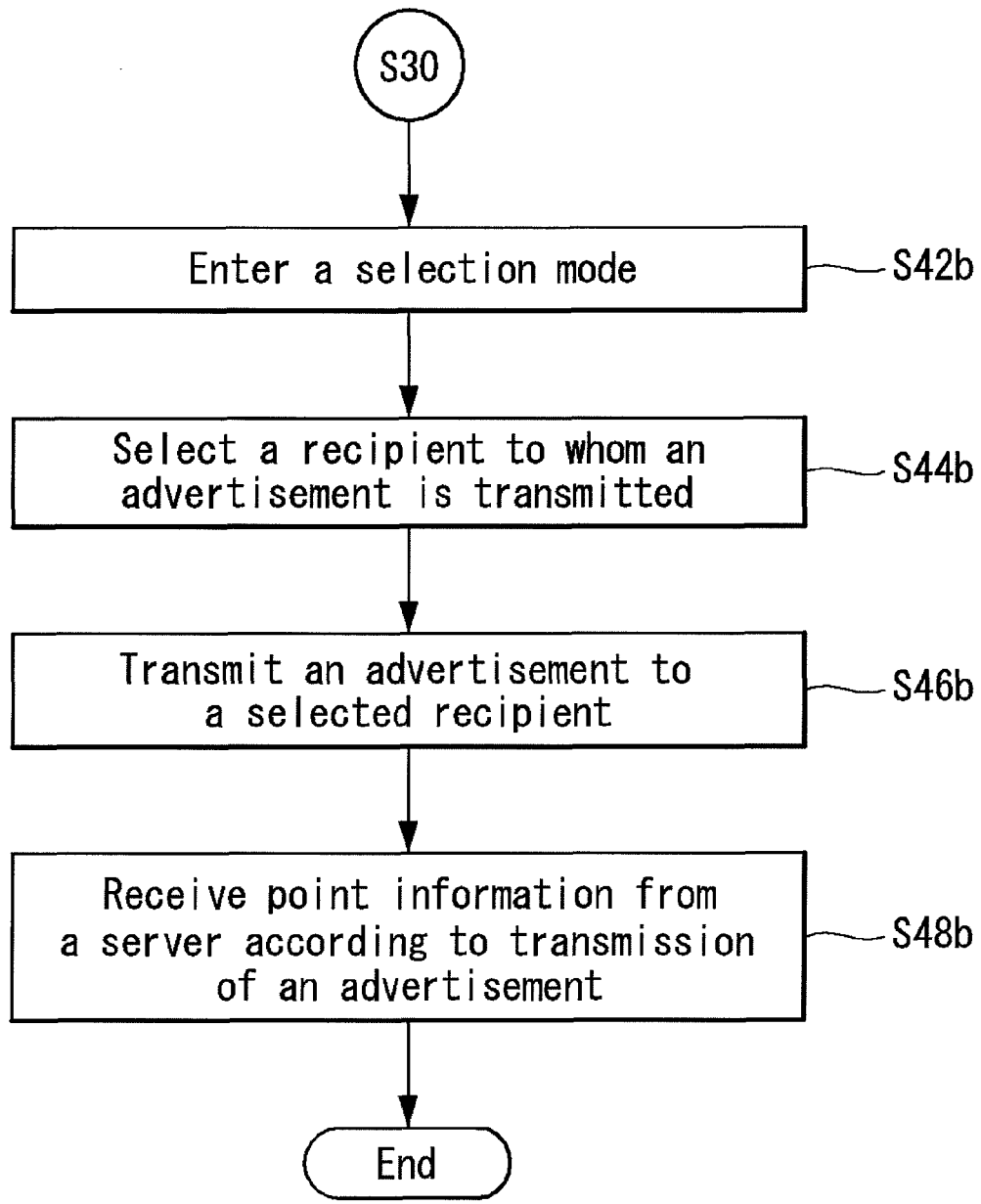
FIG. 16 is a flow chart specifically illustrating another embodiment of a procedure for carrying out a function corresponding to a selected advertisement according to FIG. 5.
Figure 17:
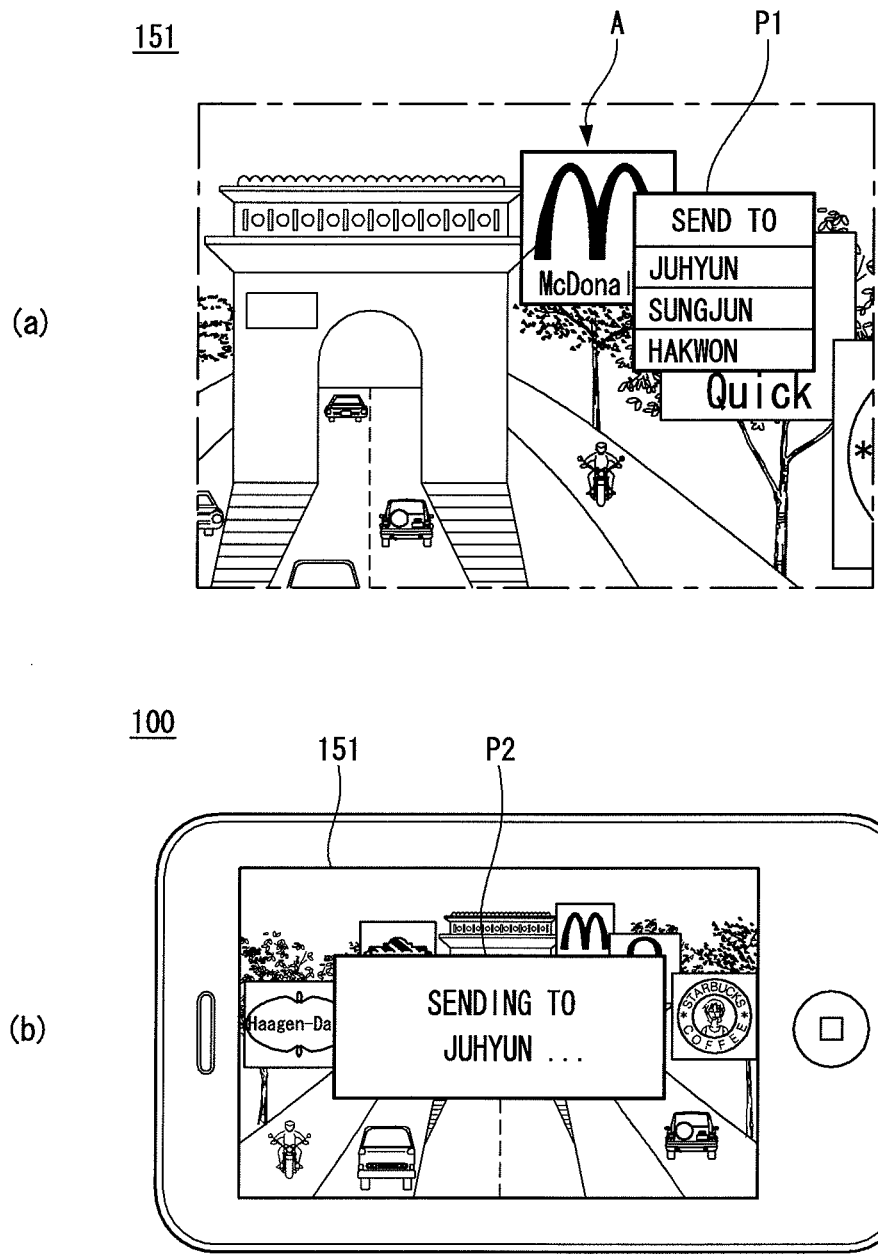
FIGS. 17 and 18 illustrate the operation of the mobile terminal of FIG. 16.
Figure 18:
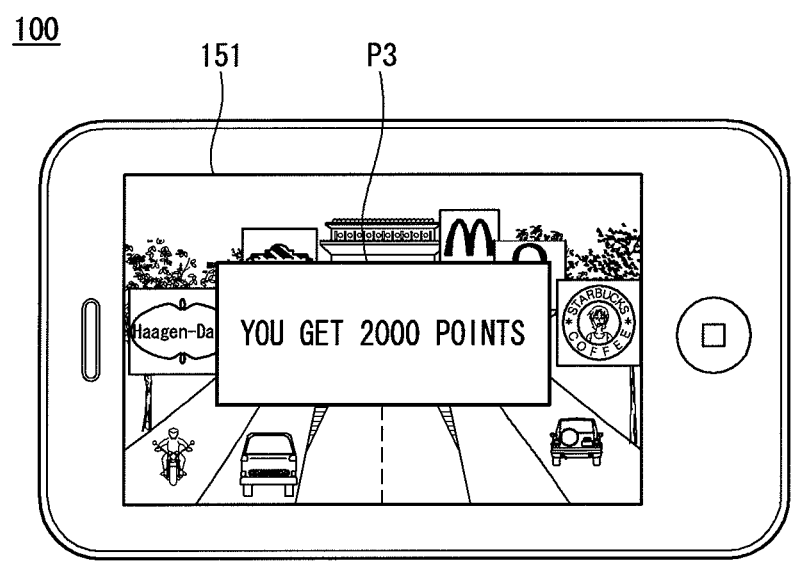

FIG. 16 is a flow chart specifically illustrating another embodiment of a procedure for carrying out a function corresponding to a selected advertisement according to the method of FIG. 5; and FIGS. 17 and 18 illustrate the operation of a mobile terminal according to the method of FIG. 16.

The controller (180 of FIG. 1) of a mobile terminal 100 according to another embodiment of the present invention can make the step (S40 of FIG. 5) of carrying out a function corresponding to a selected advertisement include the step S42b of entering an advertisement transmission mode.

The advertisement transmission mode is a process for the user of a particular mobile terminal 100 to transmit a particular advertisement selected to the user of another mobile terminal 100.

A step S44b of selecting a recipient who will receive the advertisement can be carried out in the advertisement transmission mode.

As shown in FIG. 17(a), the recipient who will receive the advertisement can be chosen from a first pop-up window P1 appearing after the user selects a particular advertisement image A. The user can transmit the advertisement after choosing one recipient or multiple recipients.

If a recipient is chosen, a step S46b of transmitting an advertisement to the chosen recipient can be carried out.

While transmitting an advertisement to the chosen recipient, a second pop-up window P2 notifying the user of transmission of the advertisement can be displayed.

A step S48b of receiving point information according to the transmission of an advertisement from the server S can be carried out once the advertisement is transmitted to the chosen recipient.

As shown in FIG. 18, points are provided not only for the case when the user of the mobile terminal 100 watches an advertisement but also for the case when the user transmits an advertisement to the other users. Point information provided can be received from the server S; the content thereof can be displayed on a third pop-up window P3.

Figure 19:
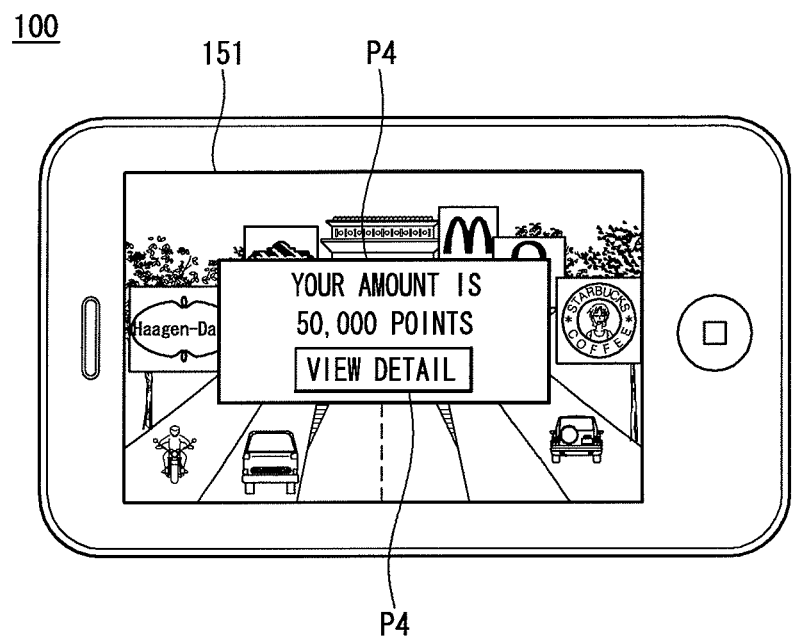
FIGS. 19 and 20 illustrate yet another embodiment of a procedure for carrying out a function corresponding to a selected advertisement according to FIG. 5.
Figure 20:
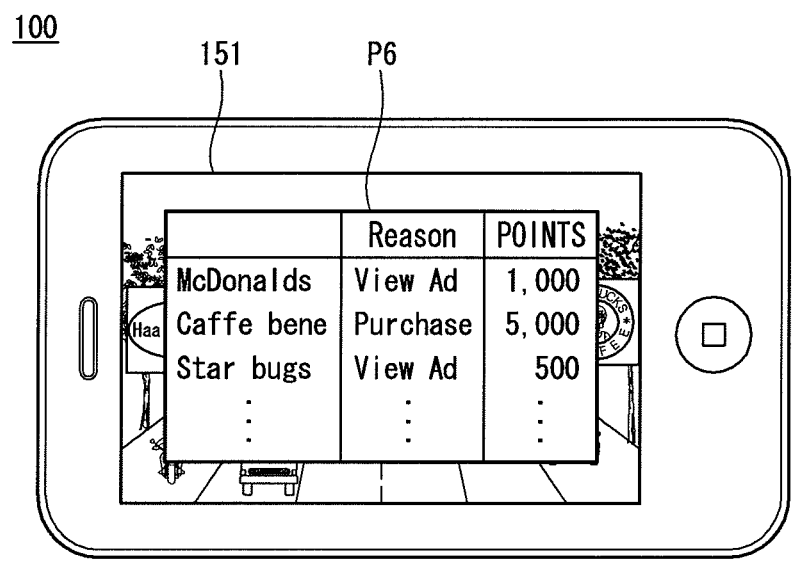

FIGS. 19 and 20 illustrate yet another embodiment of a procedure for carrying out a function corresponding to a selected advertisement according to the method of FIG. 5.

As shown in the figures, the controller (180 of FIG. 1) of the mobile terminal 100 according to yet another embodiment of the present invention can increase user convenience by displaying and managing point information for the user.

As shown in FIG. 19, the display module 151 can display a fourth pop-up window P4. The fourth pop-up window P4 can display the total amount of points accumulated as of present by the user of the mobile terminal 100. Also, the controller (180 of FIG. 1) can display a fifth pop-up window where more specific content about the points can be displayed.

As shown in FIG. 20, the display module 151 can display a sixth pop-up window P6 where a specific record of point accumulation is displayed. In other words, the sixth pop-up window P6 displays a specific target item for point accumulation, type of point accumulation which may be the selection of an advertisement or purchase of goods, a specific amount of points accumulated for the respective behaviors, and the like.

Figure 21:
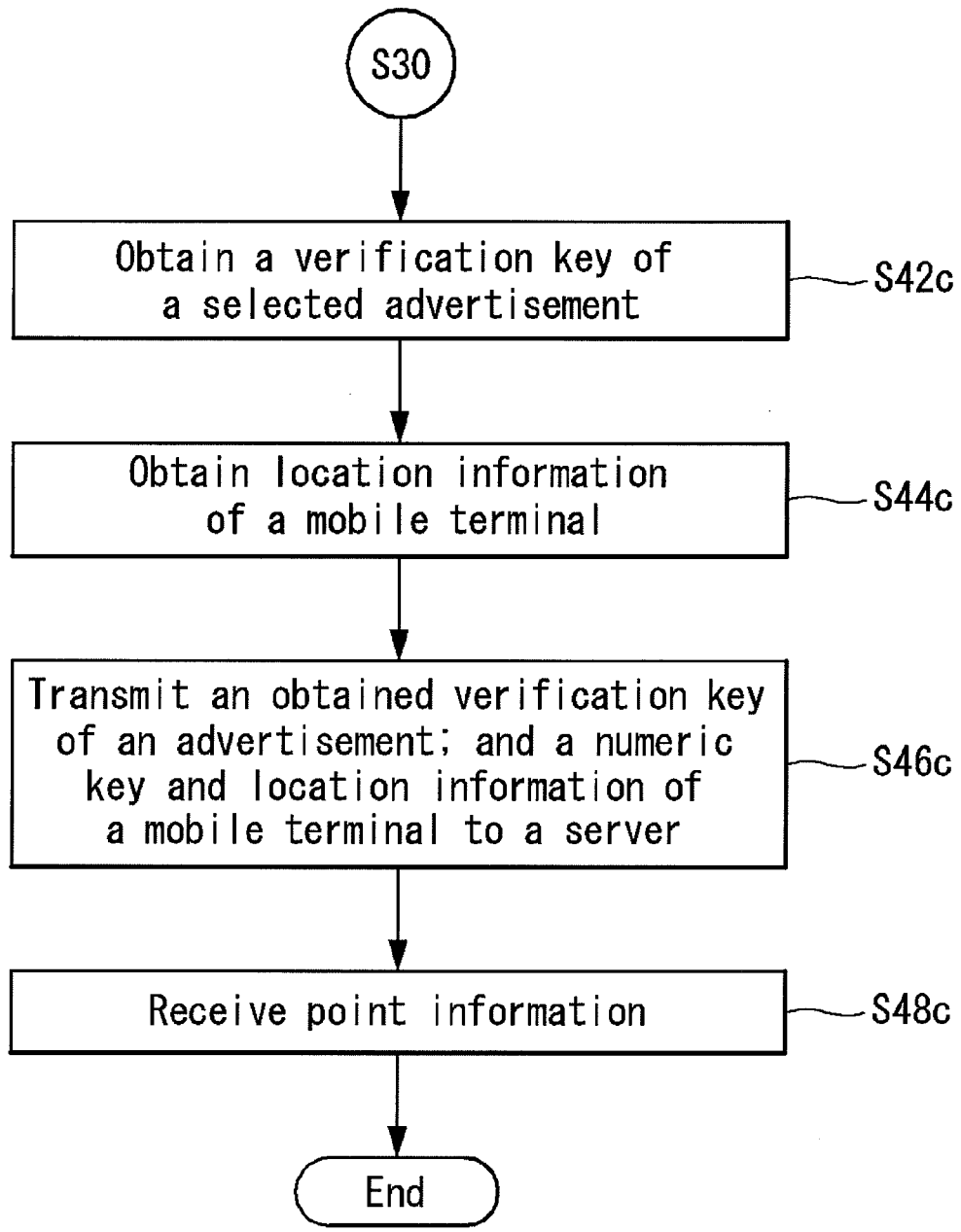
FIG. 21 is a flow chart illustrating another embodiment of a procedure of carrying out a function corresponding to a selected advertisement according to FIG. 5.
Figure 22:
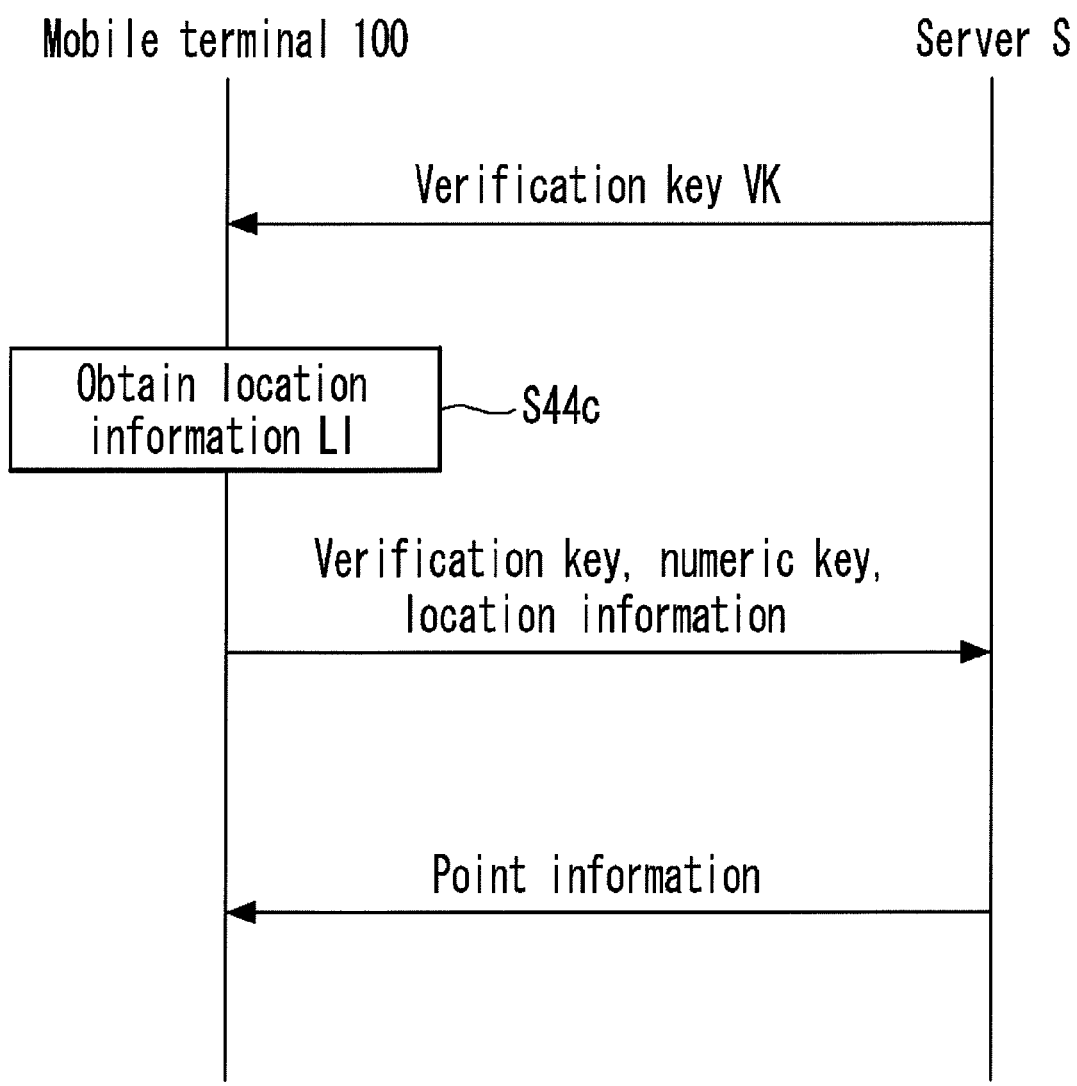
FIG. 22 illustrates an example of the operation of the mobile terminal of FIG. 21.

FIG. 21 is a flow chart illustrating another embodiment of a procedure of carrying out a function corresponding to a selected advertisement according to the method of FIG. 5; FIG. 22 illustrates an example of the operation of a mobile terminal according to the method of FIG. 21.

As shown in the figures, the step (S40 of FIG. 5) of carrying out a function corresponding to a selected advertisement of the mobile terminal 100 according to still another embodiment of the present invention can comprise a step S42c of obtaining a verification key VK of the selected advertisement and a step S44c of obtaining location information LI of the mobile terminal 100.

The location information LI can be the absolute coordinates of the current location of the mobile terminal 100 on the ground plane. The location of the mobile terminal 100 can be calculated through a method of receiving particular signals from satellites (AO of FIG. 8).

A step S46c of wirelessly transmitting a verification key VK of an obtained advertisement, a numeric key NK of the mobile terminal 100, and location information LI thereof to the remote server S and a step S48c of receiving point information can be included.

Since location information LI is also wirelessly transmitted to the remote server S in addition to the verification key VK and the numeric key NK, the remote server S can know at which location the user has selected the advertisement. The above data, once obtained, can be used to analyze which location provides more exposure to the user among the advertisements at various locations.

Figure 23:
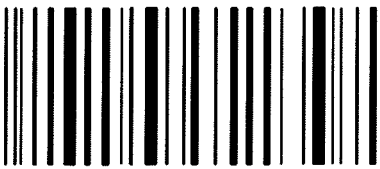
FIG. 23 illustrates an example of the operation of a mobile terminal according to another embodiment of the present invention.

FIG. 23 illustrates an example of the operation of a mobile terminal according to another embodiment of the present invention.

As shown in the figure, the controller (180 of FIG. 1) of the mobile terminal 100 according to another embodiment of the present invention can recognize a barcode shape recorded in a receipt. The barcode in a receipt R can be an evidence to indicate that an item has been purchased at a shop. The controller (180 of FIG. 1) can wirelessly transmit the barcode itself or the information obtained from the barcode to the remote server S. The remote server S which has received the information can provide points to the mobile terminal 100 of the user. Meanwhile, although FIG. 23 illustrates an example of a method of recognizing a barcode shape recorded in a receipt R, it is not limited to recognition of barcodes. In other words, it should be understood that points can be obtained by recognizing various kinds of images which can indicate the purchase of particular goods.

The embodiments above describe the cases where points are given when the user selects an advertisement image displayed on an image being photographed by the camera. It should be noted that points can also be provided for the user if the user selects an advertisement image displayed on an image photographed by other people such as a broadcast image.

The above-described methods of controlling the mobile terminal may be written as one or more computer programs and may be implemented in one or more digital microprocessors that execute the programs using a computer readable recording medium. The methods of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices, etc. The computer readable recording medium may also be distributed over network coupled computer systems so that the computer readable code is stored and executed in a distribution fashion.

The mobile terminal according to the embodiments of the present invention may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., preferably means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a camera configured to obtain an image;
   a display unit configured to display the obtained image;
   a controller operatively connected to the camera and the display unit, the controller configured to
      display advertisement images about corresponding points of purchase included in the obtained image by overlapping the advertisement images with the displayed image, and
      if a selection signal for one of the displayed advertisement images is received, display the advertisement image corresponding to the selection signal in such a way as to be distinguished from a display of the advertisement image corresponding to the selection signal before receiving the selection signal; and
   a wireless communication unit operatively connected to the controller, the wireless communication unit configured to receive a verification key assigned to the advertisement image corresponding to the selection signal, the verification key indicating information for distinguishing the advertisement image corresponding to the selection signal from non-selected advertisement images,
   wherein the advertisement image corresponding to the selection signal is displayed based on the verification key, and is distinguished by changing a display status thereof.

2. The mobile terminal of claim 1,
   wherein the wireless communication unit is further configured to receive information about the points of purchase and the advertisement images from a remote device, and
   wherein the controller is configured to display the advertisement images based on the obtained information about the points of purchase.

3. The mobile terminal of claim 2, wherein the wireless communication unit is configured to receive, from the remote device, a numeric key for distinguishing a point of purchase corresponding to the advertisement image corresponding to the selection signal.

4. The mobile terminal of claim 2, wherein the controller is configured to
   obtain connection information of the advertisement image corresponding to the selection signal, and
   store the obtained connection information in a memory of the mobile terminal.

5. The mobile terminal of claim 1, wherein the controller is configured to display specific information of the advertisement image corresponding to the selection signal.

6. The mobile terminal of claim 1,
   wherein the wireless communication unit is further configured to transmit the received verification key and a numeric key of the mobile terminal according to a control signal of the controller.

7. The mobile terminal of claim 1,
   wherein the wireless communication unit is further configured to obtain point information from a remote server.

8. The mobile terminal of claim 7, wherein the controller is configured to display the obtained point information on the display unit according to a user selection.

9. The mobile terminal of claim 1, wherein the controller is configured to obtain the advertisement images selectively according to a photographing direction of the camera.

10. A displaying method of a mobile terminal, the method comprising:

obtaining an image by a camera of the mobile terminal;

displaying, by the mobile terminal, advertisement images about points of purchase included in the obtained image by overlapping the advertisement images with the obtained image;

receiving, by the mobile terminal, a selection signal for one of the displayed advertisement images;

wirelessly receiving, by the mobile terminal, a verification key assigned to the advertisement image corresponding to the selection signal, the verification key indicating information for distinguishing the advertisement image corresponding to the selection signal from non-selected advertisement images; and based on the verification key, displaying, by the mobile terminal, the advertisement image corresponding to the selection signal in such a way as to be distinguished from a display of the advertisement image corresponding to the selection signal before receiving the selection signal, wherein the advertisement image corresponding to the selection signal is distinguished by changing a display status thereof.

11. The method of claim 10, wherein the displaying advertisement images by overlapping comprises:

obtaining information about the points of purchase; and displaying the advertisement images based on the obtained information.

12. The method of claim 11, wherein the obtaining information about the points of purchase comprises:

obtaining, by the mobile terminal, a numeric key for distinguishing a point of purchase corresponding to the advertisement image corresponding to the selection signal from unselected points of purchase.

13. The method of claim 10, further comprising:

displaying, by the mobile terminal, specific information of the advertisement image corresponding to the selection signal.

14. The method of claim 10, further comprising:

wirelessly transmitting, by the mobile terminal, the received verification key and a numeric key of the mobile terminal.

15. The method of claim 14, further comprising:

obtaining point information by the mobile terminal.

16. The method of claim 10, further comprising:

wirelessly receiving the advertisement images selectively according to a photographing direction of the camera.

17. A displaying method of a mobile terminal, the method comprising:

obtaining an image by a camera of the mobile terminal;

displaying, by the mobile terminal, advertisement images about points of purchase included in the obtained image by overlapping the advertisement images with the obtained image;

receiving, by the mobile terminal, a selection signal about one of the displayed advertisement images;

wirelessly receiving, by the mobile terminal, a verification key assigned to the advertisement image corresponding to the selection signal, the verification key indicating information for distinguishing the advertisement image corresponding to the selection signal from non-selected advertisement images; and based on the verification key, carrying out, by the mobile terminal, a function corresponding to the advertisement image corresponding to the selection signal, wherein the function changes a display status of the advertisement image corresponding to the selection signal and thereby the advertisement image is distinguished from a display of the advertisement image corresponding to the selection signal that is displayed before receiving the selection signal.

18. The method of claim 17, wherein the carrying out a function comprises one of:

deactivating the display of the advertisement image corresponding to the selection signal for a first predetermined period of time; and deactivating the function for a second predetermined period of time after carrying out the function.

19. The method of claim 17, wherein the displaying advertisement images comprises:

selectively displaying the advertisement images in accordance with predetermined conditions.

* * * * *